United States Patent
Hu et al.

(10) Patent No.: US 11,566,943 B2
(45) Date of Patent: Jan. 31, 2023

(54) METHODS AND SYSTEMS FOR QUANTITATIVELY MEASURING PHOTOPROTECTION

(71) Applicant: Hallstar Beauty and Personal Care Innovations Company, Chicago, IL (US)

(72) Inventors: Shengkui Hu, Darien, IL (US); Hui Feng, Suzhou (CN); Meng Wei, Suzhou (CN); Zhiliang Jin, Suzhou (CN); Ruipeng Wang, Suzhou (CN)

(73) Assignee: Hallstar Beauty and Personal Care Innovations Company, Chicago, IL (US)

( * ) Notice: Subject to any disclaimer, the term of this patent is extended or adjusted under 35 U.S.C. 154(b) by 0 days.

(21) Appl. No.: 17/068,331

(22) Filed: Oct. 12, 2020

(65) Prior Publication Data

US 2021/0033459 A1 Feb. 4, 2021

Related U.S. Application Data

(62) Division of application No. 15/966,791, filed on Apr. 30, 2018, now Pat. No. 10,801,892.

(Continued)

(51) Int. Cl.
*G01J 3/42* (2006.01)
*G01N 21/25* (2006.01)
(Continued)

(52) U.S. Cl.
CPC . *G01J 3/42* (2013.01); *G01J 1/50* (2013.01); *G01N 21/25* (2013.01); *G01N 21/33* (2013.01); *G01N 21/8422* (2013.01)

(58) Field of Classification Search
CPC .......... G01J 3/42; G01J 1/50; G01N 21/8422; G01N 21/33; G01N 21/25; G01N 1/28;
(Continued)

(56) References Cited

U.S. PATENT DOCUMENTS

| 6,245,444 B1 * | 6/2001 | Marcus | G01R 1/06761 |
| | | | 428/617 |
| 7,015,270 B2 | 3/2006 | Scharfe et al. | |

(Continued)

FOREIGN PATENT DOCUMENTS

| CN | 201277948 Y * | 7/2009 | ............. G01N 21/41 |
| CN | 2012277948 Y | 7/2009 | |

(Continued)

OTHER PUBLICATIONS

International Search Report and Written Opinion dated Jan. 28, 2020 in connection with International Application No. PCT/US2019/055053, 12 pages.

(Continued)

*Primary Examiner* — Mohamed K Amara
(74) *Attorney, Agent, or Firm* — Baker McKenzie

(57) ABSTRACT

The present disclosure relates, according to some embodiments, to a method of determining a quantitatively measured photoprotection of a photoprotective composition, the method comprising: (a) distributing the photoprotective composition in a position in between a drawdown bar and at least one substrate to produce a distributed photoprotective composition; (b) drawing down the distributed photoprotective composition to a thickness on at least one substrate to produce a drawn down sample film; (c) drying the drawn down sample film to produce a dried sample film; (d) measuring a UV absorption of the dried sample film to produce a UV absorption spectrum; (e) determining the (Continued)

quantitatively measured photoprotection of the photoprotective composition from the UV absorption spectrum.

13 Claims, 31 Drawing Sheets

Related U.S. Application Data

(60) Provisional application No. 62/492,906, filed on May 1, 2017.

(51) Int. Cl.
*G01J 1/50* (2006.01)
*G01N 21/84* (2006.01)
*G01N 21/33* (2006.01)

(58) Field of Classification Search
CPC ........... G01N 21/01; G01N 2021/0112; G01N 2021/4742; G01N 21/474; G01N 21/49; A61B 5/0075; A61B 5/0077; A61B 5/0082; A61B 5/441
See application file for complete search history.

(56) References Cited

U.S. PATENT DOCUMENTS

| | | | |
|---|---|---|---|
| 8,598,535 B2 | 12/2013 | Miura et al. | |
| 9,582,748 B2* | 2/2017 | Proud | A61B 5/02055 |
| 9,841,331 B2* | 12/2017 | Wood | G06F 3/014 |
| 2004/0195519 A1 | 10/2004 | Refregier et al. | |
| 2006/0244961 A1 | 11/2006 | Cole et al. | |
| 2008/0283151 A1 | 11/2008 | Floyd et al. | |
| 2010/0014069 A1 | 1/2010 | Miura et al. | |
| 2010/0045971 A1 | 2/2010 | Brokopp | |
| 2012/0022472 A1 | 1/2012 | Miura et al. | |
| 2012/0040282 A1* | 2/2012 | Heuft | G03G 5/0589 |
| | | | 430/58.05 |
| 2012/0123027 A1* | 5/2012 | Zhou | C09D 103/08 |
| | | | 524/53 |
| 2013/0021609 A1 | 1/2013 | Lo et al. | |
| 2013/0300850 A1 | 11/2013 | Millikan | |
| 2014/0154370 A1* | 6/2014 | Wood | A01N 3/02 |
| | | | 427/256 |
| 2015/0308945 A1 | 10/2015 | Hanyu et al. | |
| 2016/0096192 A1* | 4/2016 | Bush | A47L 13/22 |
| | | | 427/8 |
| 2018/0202927 A1 | 7/2018 | Isikman et al. | |
| 2018/0303135 A1 | 10/2018 | Tribelsky et al. | |
| 2018/0313694 A1* | 11/2018 | Hu | G01N 21/8422 |
| 2018/0321139 A1 | 11/2018 | Helfmann et al. | |
| 2019/0145957 A1 | 5/2019 | Stilla et al. | |

FOREIGN PATENT DOCUMENTS

| | | | | |
|---|---|---|---|---|
| CN | 102493986 A | | 6/2012 | |
| CN | 104583780 A | * | 4/2015 | ................ B01L 3/00 |
| CN | 104090172 B | * | 10/2016 | ................ G01N 1/28 |
| CN | 108333686 A | | 7/2018 | |
| KR | 20170037026 A | | 4/2017 | |
| WO | 2010093503 A2 | | 8/2010 | |
| WO | 2017146782 A1 | | 8/2017 | |
| WO | 2017181293 A1 | | 10/2017 | |

OTHER PUBLICATIONS https://www.schott.com/d/advanced_optics/e5e99dc9-ba-1b-468c-b724-a4b78603575d/BG18_SDS_En_Va_201505.pdf?tenant=aocert.

* cited by examiner

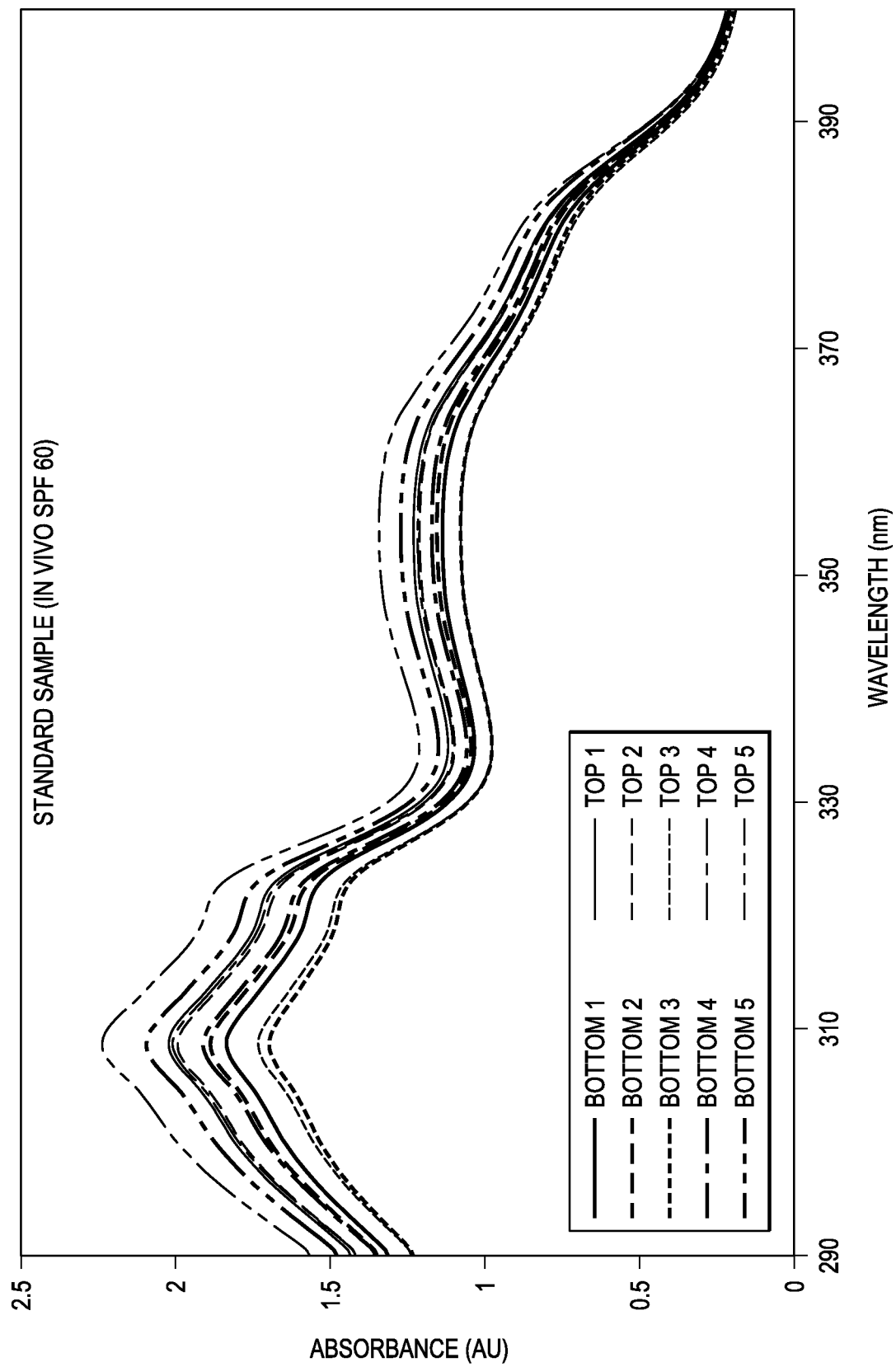

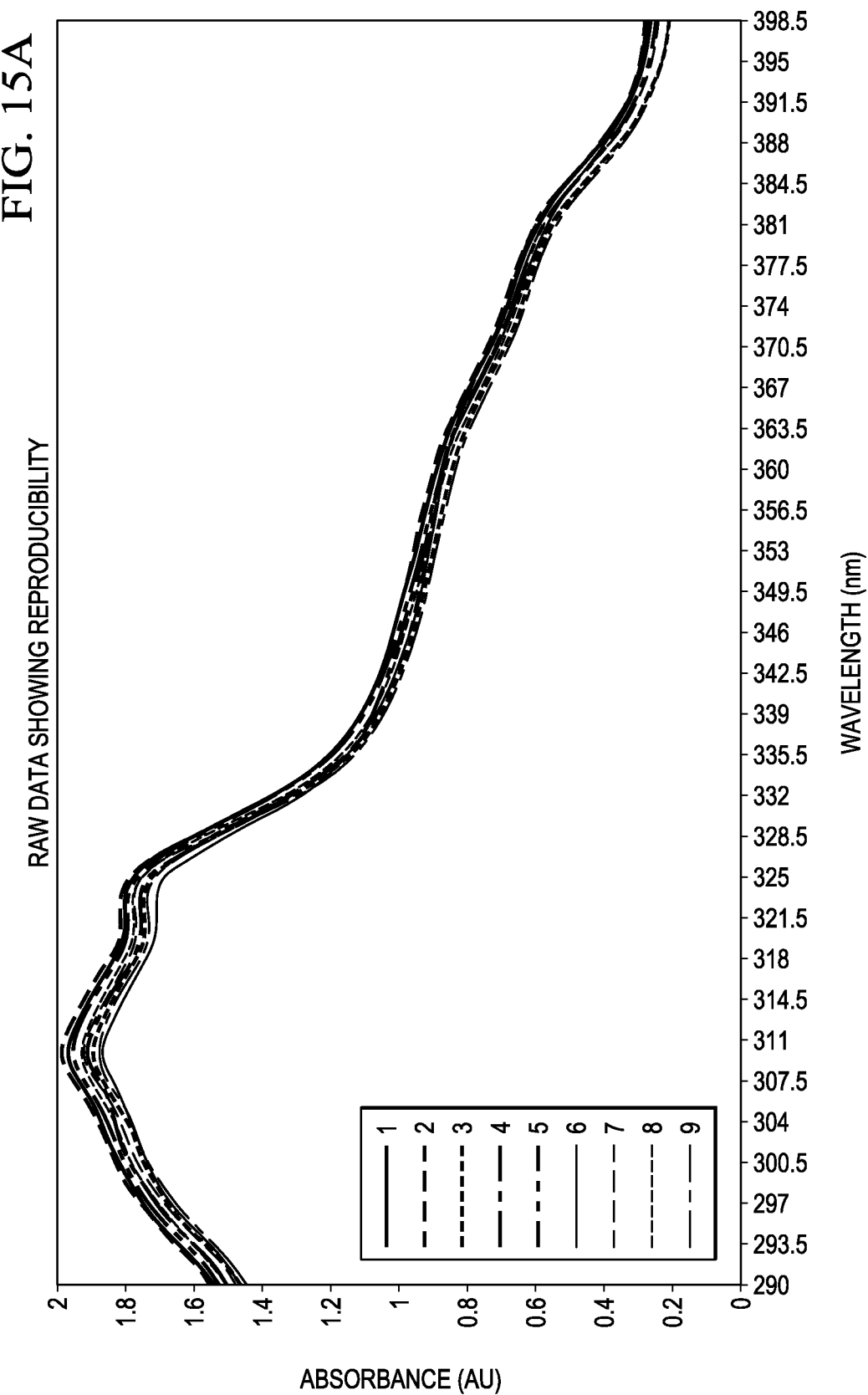

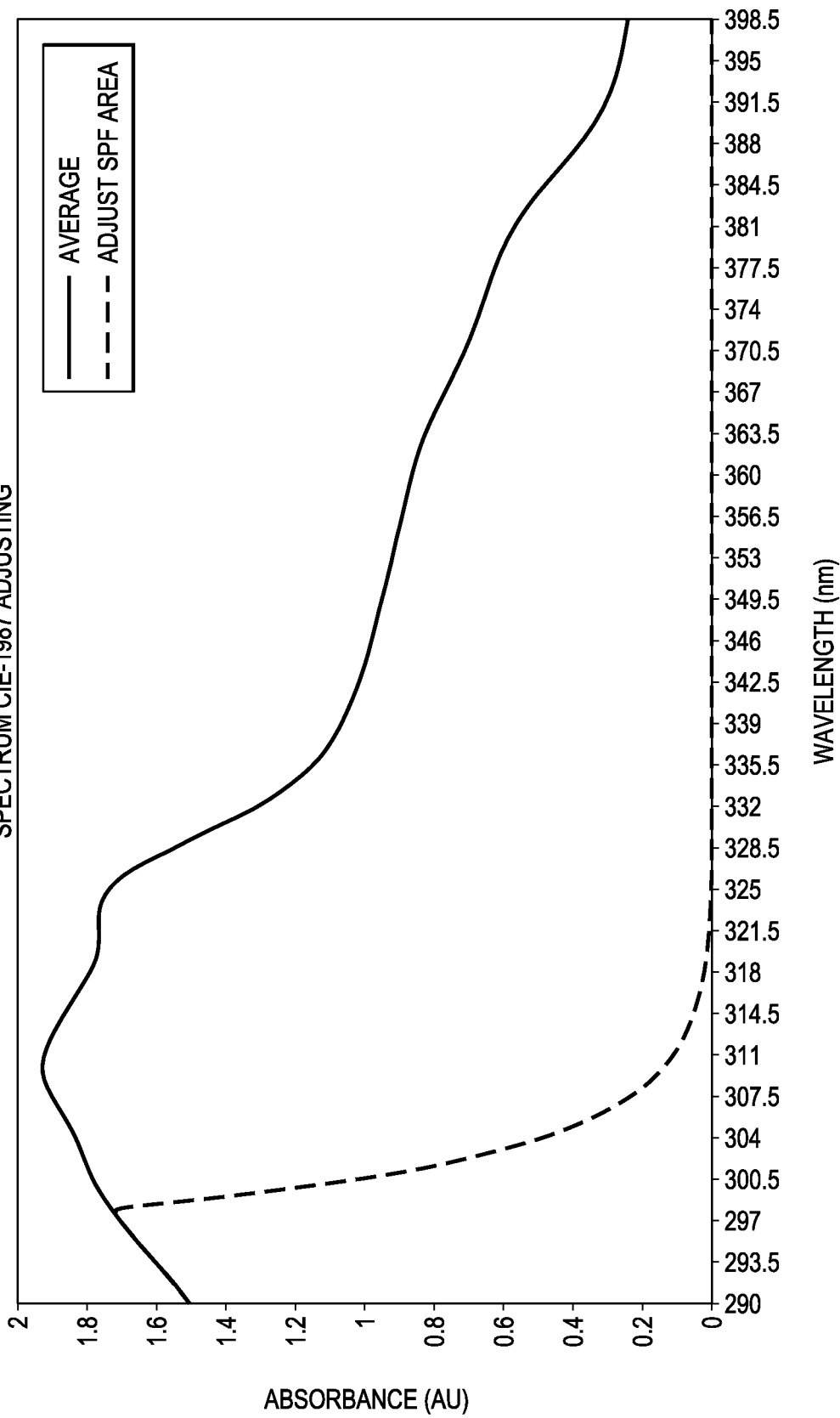

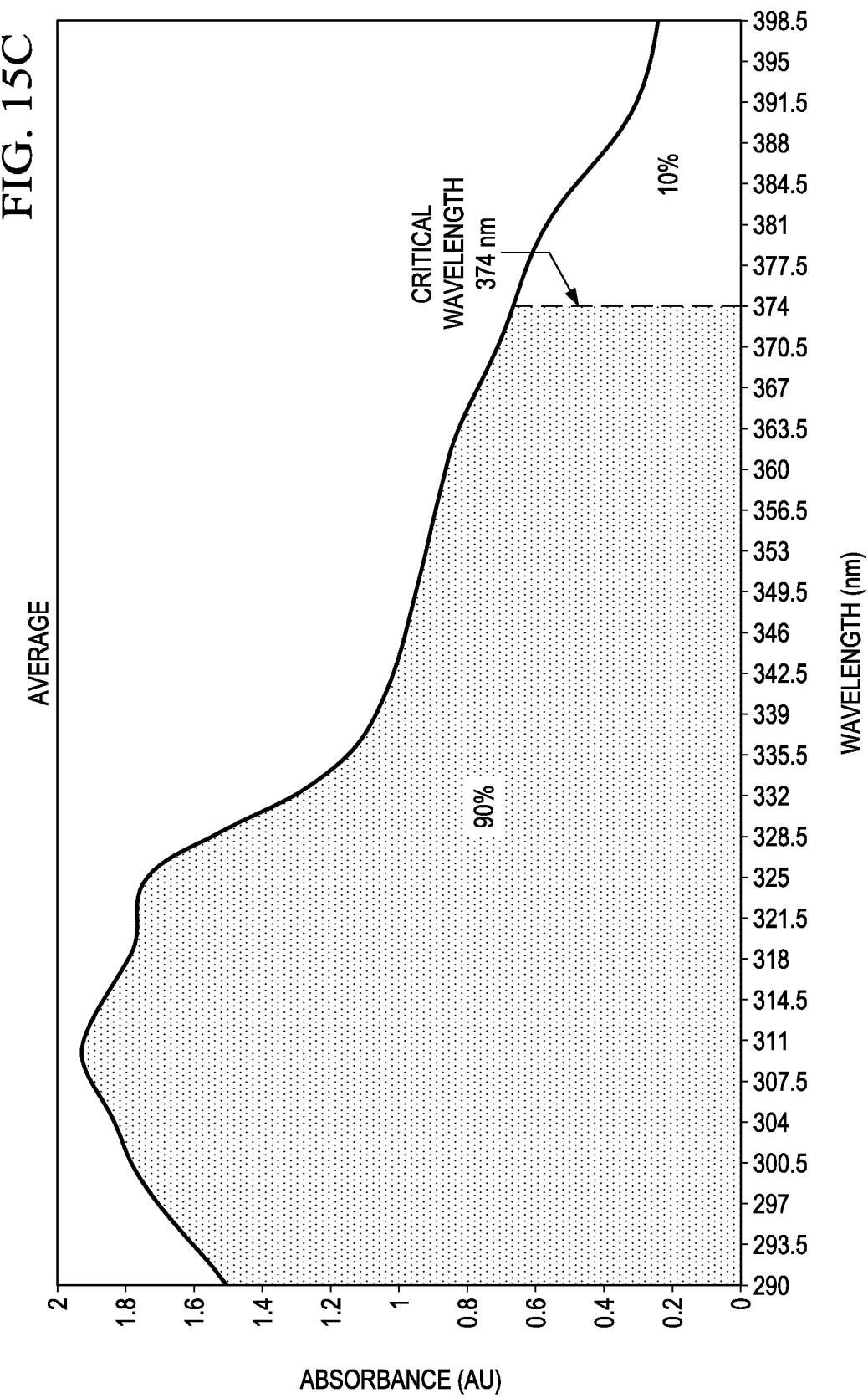

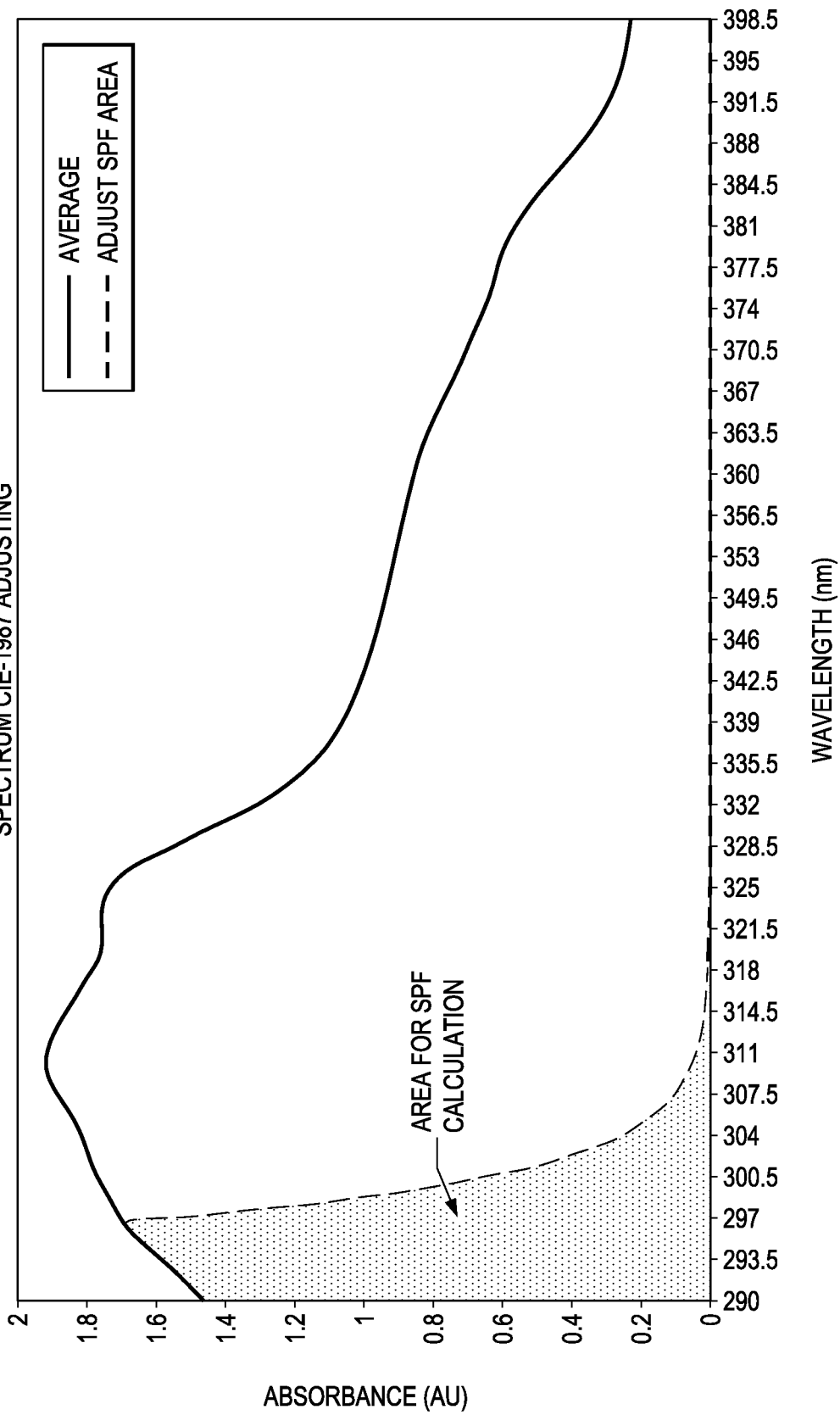

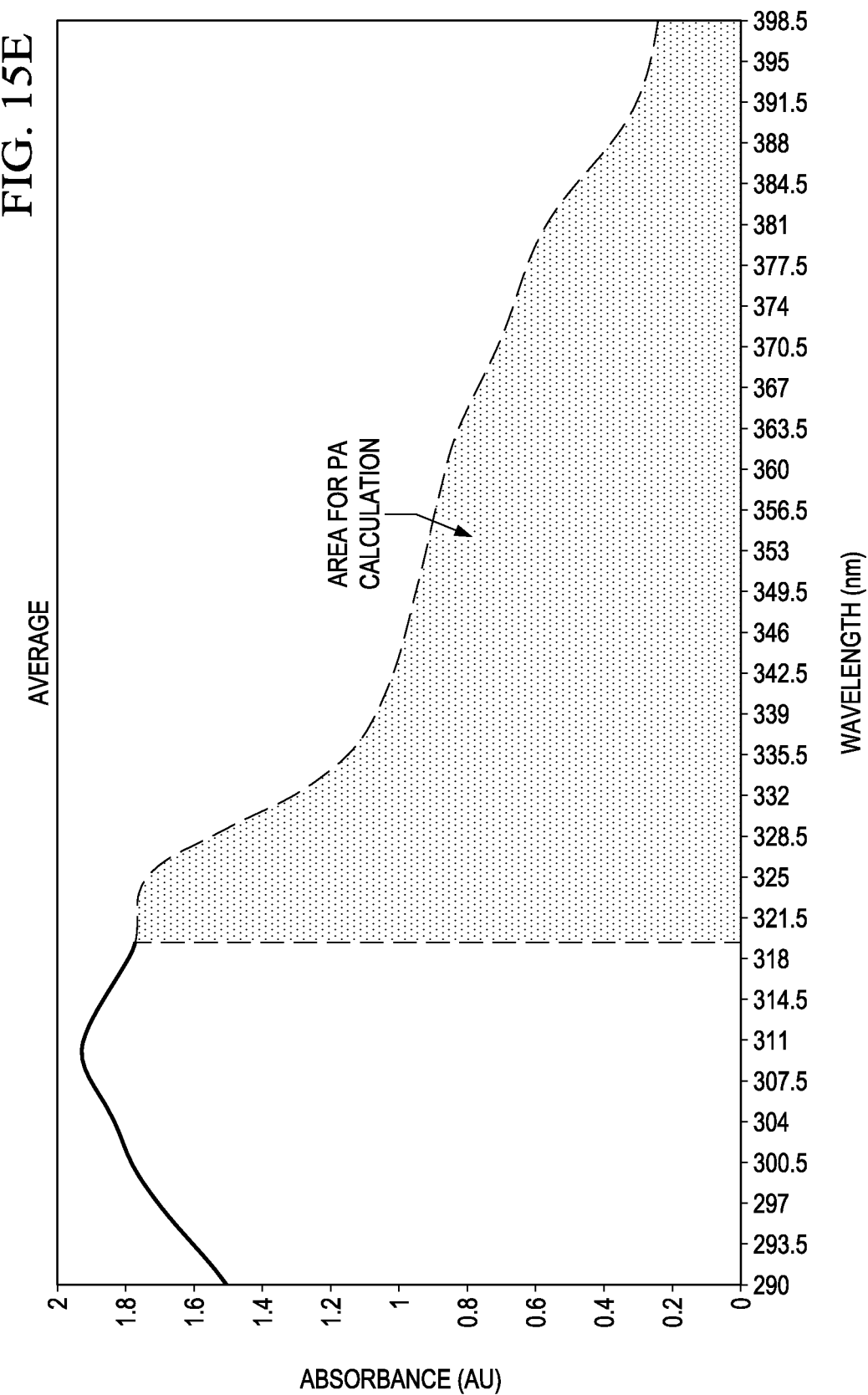

METHODS AND SYSTEMS FOR QUANTITATIVELY MEASURING PHOTOPROTECTION

CROSS-REFERENCE TO RELATED APPLICATIONS

This application is a division of and claims priority to U.S. patent application Ser. No. 15/966,791 filed Apr. 30, 2018, and also claims prior priority to Provisional Patent Application No. 62/492,906, filed May 1, 2017. The contents of all of the above are hereby incorporated in their entirety by reference.

FIELD OF THE DISCLOSURE

The present disclosure relates, in some embodiments, to systems and methods for determining a sun protection performance such as sun protection factor (SPF), and UVA protection factor (PFA) for photoprotective compositions (e.g., sunscreens).

BACKGROUND OF THE DISCLOSURE

A sun protection factor (SPF) may directly correlate to the ability for an ultraviolet (UV) filter to protect a substrate from UV damage caused by both UVA (i.e., 320-400 nm) and UVB (i.e., 290-320 nm) radiation. For humans and animals, UV damage may cause premature skin aging, eye damage (e.g., cataracts), and skin cancer. UV damage may also cause the degradation of materials such as polymers, inks, dyes, glass, metals, paints, pesticides, herbicides, pharmaceuticals, and foodstuffs. Photo-protective compositions (e.g., UV filters) may differentially protect a substrate from UV radiation different intensities, wavelength ranges, and for varying durations of time. Assessment of whether a photo-protective composition provides desirable degree of protection may rely upon accurate and precise determination of an SPF value for such formulation.

SUMMARY

Accordingly, a need has arisen for improved systems and methods for determining a quantitatively measured photoprotection of a photoprotective composition. The present disclosure relates, in some embodiments, to a method of determining a quantitatively measured photoprotection of a photoprotective composition. A method may comprise distributing a photoprotective composition in a position in between a drawdown bar and at least one substrate to produce a distributed photoprotective composition. A method may comprise drawing down a distributed photoprotective composition to a thickness on at least one substrate to produce a drawn down sample film. A method may comprise drying a drawn down sample film to produce a dried sample film. A method may comprise measuring a UV absorption of the dried sample film to produce a UV absorption spectrum. A method may comprise determining the quantitatively measured photoprotection of the photoprotective composition from a UV absorption spectrum.

According to some embodiments, the present disclosure relates to diluting the photoprotective composition with at least one solution to a viscosity from about 1000 cP to about 9000 cP before distributing the photoprotective composition in the position in between a drawdown bar and a at least one substrate. At least one solution may comprise water, a carbomer, a polyacrylic acid, a sodium polyacrylate, a dimethicone vinyl crosspolymer, an alkyl acrylate dimethicone crosspolymer, a cyclopentasiloxane, or combinations thereof. A thickness may range from about 10 µm to about 100 µm. Drying a drawdown sample film may comprise heating a drawdown sample at a temperature from about 25° C. to about 60° C. for a time from about 10 minutes to about 120 minutes. At least one substrate may be selected from the group consisting of a glass, a polymer, a skin, a metal, and a textile. A glass may comprise a silica, a quartz, a fused silica, a borosilicate glass, a soda-lime silicate glass, a phosphate glass, or a combinations thereof. A skin may comprise a porcine skin, a human skin, a cow skin, a mouse skin, a rat skin, a frog skin, a snake skin, or combinations thereof. A substrate may have a length from about 50 mm to about 100 mm, a width from about 10 mm to about 40 mm, and a height from about 0.5 mm to about 5 mm Measuring a UV absorption of a dried sample film may comprise measuring an absorbance at a range from about 200 nm to about 400 nm. Determining a quantitatively measured photoprotection of a photoprotective composition may comprise integrating a UV absorption spectrum. Distributing a photoprotective composition in the position in between a drawdown bar and at least one substrate may comprise pumping, pipetting, syringing, pouring, positive displacing, scooping, smearing, spraying, squirting, transferring, displacing, or combinations thereof. A photoprotective composition may comprise a sunscreen.

A method of determining a quantitatively measured photoprotection of a photoprotective composition may comprise spraying at least one coat of the photoprotective composition to a thickness on at least one surface of a substrate to produce a spray coated substrate sample. A method may comprise drying the spray coated substrate sample to produce a dried sample film. A method may comprise measuring a UV absorption of the dried sample film to produce a UV absorption spectrum. A method may comprise determining the quantitatively measured photoprotection of the photoprotective composition from the UV absorption spectrum.

According to some embodiments, the present disclosure relates to diluting a photoprotective composition with at least one solution to a viscosity from about 1000 cP to about 9000 cP before spraying at least one coat of the photoprotective composition on the at least one surface of the substrate. A solution may comprise water, a carbomer, a polyacrylic acid, a sodium polyacrylate, a dimethicone vinyl crosspolymer, an alkyl acrylate dimethicone crosspolymer, a cyclopentasiloxane, or combinations thereof. A thickness may range from about 10 µm to about 100 µm. Drying a drawdown sample film may comprise heating the drawdown sample at a temperature from about 25° C. to about 60° C. for a time from about 10 minutes to about 120 minutes. A substrate may be selected from the group consisting of a glass, a polymer, a skin, a metal, and a textile. A glass may comprise silica, quartz, fused silica, borosilicate glass, soda-lime silicate glass, phosphate glass, or combinations thereof. A skin may comprise a porcine skin, a human skin, a cow skin, a mouse skin, a rat skin, a frog skin, a snake skin, or a combination thereof. A substrate may have a length from about 50 mm to about 100 mm, a width from about 10 mm to about 40 mm, and a height from about 0.5 mm to about 5 mm Measuring a UV absorption of the dried sample film may comprise measuring an absorbance at a range from about 200 nm to about 400 nm. Determining a quantitatively measured photoprotection of a photoprotective composition may comprise integrating a UV absorption spectrum. A photoprotective composition may comprise a sunscreen.

A drawdown system for quantitatively measuring photoprotection of a photoprotective composition may comprise at least one substrate. A drawdown system may comprise a platform configured to receive the at least one substrate. A photoprotective composition may comprise a drawdown bar assembly comprising. A drawdown bar assembly may comprise a frame; a drawdown bar; and at least two spiral micrometers configured to adjust the height of the drawdown bar relative to the sample plate. A drawdown system may comprise a backboard configured to adjust the position of the drawdown bar assembly. A drawdown system may comprise a motor assembly movably connected to the backboard, wherein the motor assembly may be configured to adjust the position of the backboard at a velocity. A drawdown system may comprise a UV absorption spectrophotometer configured to determine an SPF of the film.

According to some embodiments, the present disclosure relates to a drawdown system that may comprise a processor configured to control the starting, resetting, velocity, and stopping of the motor assembly. A drawdown system may comprise a position guide configured to guide a position of the drawdown bar assembly. A substrate may be selected from the group consisting of a glass, a polymer, a skin, a metal, and a textile. A glass may comprise silica, quartz, fused silica, borosilicate glass, soda-lime silicate glass, phosphate glass, or combinations thereof. A skin may comprise a porcine skin, a human skin, a cow skin, a mouse skin, a rat skin, a frog skin, a snake skin, or combinations thereof. A substrate may have a length from about 50 mm to about 100 mm, a width from about 10 mm to about 40 mm, and a height from about 0.5 mm to about 5 mm. A height may be from about 25 μm to about 200 μm above a surface of the substrate. A velocity may be from about 0.1 m/s to about 1.0 m/s. A motor assembly may comprise a servomotor.

In some embodiments, a spray system for quantitatively measuring photoprotection of a photoprotective composition may comprise at least one substrate. A spay system may comprise at least one sample container configured to contain a photoprotective composition. A spay system may comprise at least one spray gun in fluid communication with at least one sample container, wherein the at least one spray gun may be configured to spray at least one coat of a photoprotective composition on the at least one substrate. A spay system may comprise a platform substantially perpendicular to the at least one spray gun, wherein the platform may be configured to support and adjust the position of the at least one substrate. A spay system may comprise a motor assembly movably connected to a platform, wherein the motor assembly may be configured to adjust the position of the platform at a velocity. A spay system may comprise a UV absorption spectrophotometer configured to determine the SPF of the at least one coat of the photoprotective composition.

According to some embodiments, a drawdown system for quantitatively measuring photoprotection of a photoprotective composition may comprise at least one substrate. A drawdown system may comprise a platform configured to receive the at least one substrate. A drawdown system may comprise a photoprotection sample receptacle configured to distribute a photoprotective composition on a surface of at least one substrate. A drawdown system may comprise a backboard configured to adjust the position of a photoprotection sample receptacle. A drawdown system may comprise a motor assembly movably connected to a backboard, wherein the motor assembly is configured to adjust the position of the backboard at a velocity. A drawdown system may comprise a UV absorption spectrophotometer configured to determine an SPF of the photoprotection composition.

In some embodiments, a spray system may comprise a vacuum chuck configured to affix the at least one substrate to the platform. A spray system may comprise a first compressor configured to provide air pressure to the at least one sample container. A spray system may comprise a second compressor configured to provide air pressure to the at least one spray gun. At least one substrate may be nonplanar. A velocity may be from about 0.1 m/s to about 1.0 m/s. At least one substrate may be selected from the group consisting of a glass, a polymer, a skin, a metal, and a textile. A glass may comprise a silica, quartz, fused silica, borosilicate glass, soda-lime silicate glass, phosphate glass, or combinations thereof. A skin may comprise a porcine skin, a human skin, a cow skin, a mouse skin, a rat skin, a frog skin, a snake skin, or combinations thereof. A spray system may comprise a spray system position guide configured to adjust the position of the platform. A spray system may comprise a switch configured control the position of the at least one spray gun. A spray system may comprise a slide way configured to provide a path for the platform to move. A motor assembly may comprise a servomotor.

BRIEF DESCRIPTION OF THE DRAWINGS

Some embodiments of the disclosure may be understood by referring, in part, to the present disclosure and the accompanying drawings, wherein:

FIG. 7C illustrates an absorbance spectrum of a sample for a drawdown system according to a specific example embodiment of the disclosure;

FIG. 15A illustrates an absorbance spectrum of raw data according to a specific example embodiment of the disclosure;

FIG. 15B illustrates an average and after erythema action spectrum according to a specific example embodiment of the disclosure;

FIG. 15C illustrates a spectrum used to determine a critical wavelength according to a specific example embodiment of the disclosure;

FIG. 15D illustrates a spectrum used to determine a sun protection factor according to a specific example embodiment of the disclosure;

FIG. 15E illustrates a spectrum used to determine an area for a protection grade of UVA (PA) according to a specific example embodiment of the disclosure;

DETAILED DESCRIPTION

Figure 1:
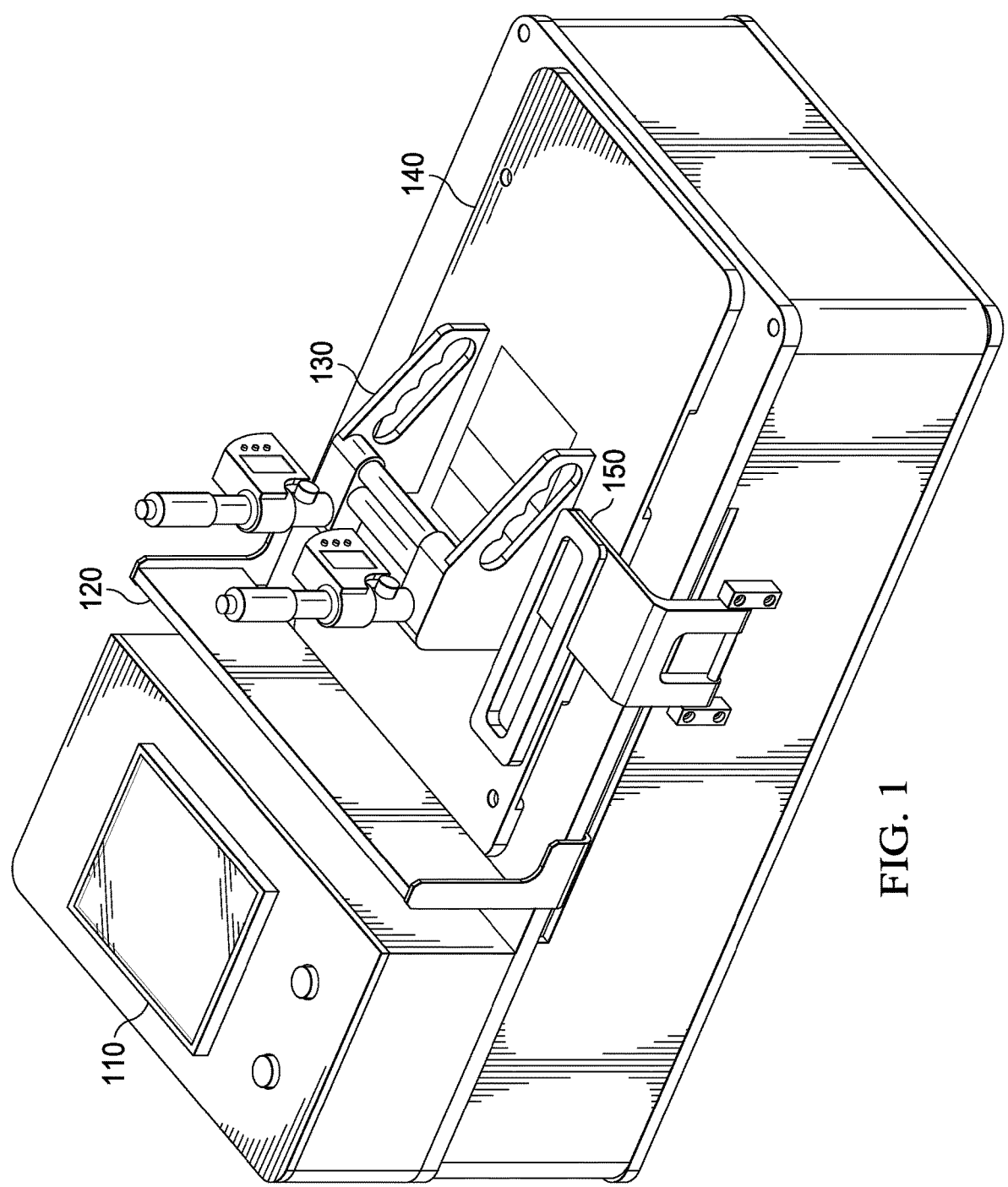
FIG. 1 illustrates an isometric view of a drawdown system according to a specific example embodiment of the disclosure.

The present disclosure relates, in some embodiments, to systems and methods for determining a sun protection factor (SPF) for photoprotective compositions (e.g., sunscreens). An SPF may directly correlate to the ability of a photoprotective composition to protect a substrate from ultraviolet (UV) damage caused by both UVA (i.e., 320-400 nm) and UVB (i.e., 290-320 nm) radiation.

According to some embodiments, a personal care product may contain a photoprotective composition. For example, sunscreen products may comprise photoprotective compositions (i.e., UV-absorbing, filtering, or scattering compounds) formulated into a cosmetically suitable vehicle for topical application to skin and/or hair. Also, products comprising polymers, inks, dyes, glass, metals, paints, pesticides, herbicides, pharmaceuticals, and foodstuffs may include photoprotective compositions that may protect the products from UV radiation mediated degradation.

An in vivo method of determining SPF may be measured on a human volunteer by applying about 2 mg/cm$^2$ of a sunscreen formula to an area of skin, allowing the sunscreen to dry for 15 minutes, and then exposing the sites treated with the sunscreen to a series of alternating UV radiation doses. Another set of similarly alternating UV radiation doses are applied to a skin that does not have sunscreen applied to it. An SPF value may be determined by examining and comparing the skin areas after a period from about 16 hours to about 24 hours after UV radiation exposure. An SPF may be calculated as a lowest dose of UV radiation that may have caused a mild sunburn in a sunscreen treated area divided by a lowest dose of UV radiation that may have caused mild sunburn in an area without sunscreen, wherein a reported SPF value of a sunscreen formula may be based on an average SPF for 10 volunteers. However, these methods may place test subjects at risk of UV damage and may produce unreliable (e.g., inaccurate and/or imprecise) test results.

Currently, the International Organization for Standardization (ISO) has no standard, regulatory agency protocol, or currently accepted method for in vitro methods of determining SPF values. An in vitro system and/or method for determining an SPF for photoprotective compositions may include measuring sunscreen SPF on artificial substrates (e.g., glass, polymer, or metal) that simulate a skin surface and/or an extracted natural substrate (e.g., human or pig skin sample) without subjecting humans or animals to UV radiation. An in vitro method for determining an SPF for photoprotective composition may comprise homogenized artificial or extracted substrates, wherein the homogenization of the artificial or extracted substrates may desirably provide SPF data that is repeatable and statistically meaningful. Homogenization of samples may comprise a homogenized and/or standardized sample thickness, surface texture, surface dimensions, UV sources, or measurement methods.

In some embodiments, an SPF may be calculated as the UV energy required to produce a minimal erythemal dose (MED) on protected skin (PS) divided by the UV energy required to produce a minimal erythemal dose on unprotected skin (US), which may also be defined by the following ratio: SPF value=MEDPS/MEDUS, where MEDPS is the minimal erythemal dose for protected skin after application of 2 milligrams per square centimeter of the sunscreen product, and MEDUS is the minimal erythemal dose for unprotected skin (i.e., skin to which no sunscreen product has been applied).

The UVA Protection Factor (UVA-PF) is the UVA (e.g., radiation with wavelengths from 320 to 400 nm) energy required to produce a minimal pigmentary dose (MPD) on protected skin (PS) divided by the UV energy required to produce a minimal pigmentary dose on unprotected skin (US), according to some embodiments, which may also be defined by the following ratio: UVA-PF value=MPDPS/MPDUS, where MPDPS is the minimal pigmentary dose for protected skin after application of 2 milligrams per square centimeter of the sunscreen product, and MPDUS is the minimal pigmentary dose for unprotected skin, i.e. skin to which no sunscreen product has been applied.

Drawdown Systems

The present disclosure relates, according to some embodiments, to methods of determining a quantitatively measured photoprotection of a photoprotective composition, wherein the methods comprise a drawdown method that may be performed by a drawdown system.

A drawdown system for quantitatively measuring photoprotection of a photoprotective composition may comprise at least one substrate, a platform configured to receive the at least one substrate; a drawdown bar assembly; a backboard configured to adjust the position of the drawdown bar assembly; a motor assembly movably connected to the backboard, wherein the motor assembly is configured to adjust the position of the backboard at a velocity; and a UV absorption spectrophotometer. A drawdown system may also comprise a processor configured to control the starting, resetting, velocity, and stopping of a motor assembly; and a position guide configured to guide a position of a drawdown bar assembly.

A drawdown bar assembly may comprise a frame; a drawdown bar; and at least two spiral micrometers configured to adjust the height of the drawdown bar relative to the sample plate. A drawdown bar may be textured or smooth. A drawdown bar may comprise a metal (e.g., stainless steel), a wood (e.g., oak), a polymer (e.g., polyethylene), a skin (e.g., human or animal), or a combination thereof. A height of a drawdown bar relative to a substrate may adjust the height of a photoprotective composition film. A height of a drawdown bar relative to a sample plate may be adjusted by at least one spiral micrometer. A height of a drawdown bar relative to a sample plate may be from about 25 µm to about 200 µm. A height of a drawdown bar relative to a sample plate may be about 25 µm, or about 50 µm, or about 75 µm, or about 100 µm, or about 125 µm, or about 150 µm, or about 175 µm, or about 200 µm.

According to some embodiments, a drawdown system may comprise a drawdown bar assembly, wherein a backboard may be configured to adjust the position of the drawdown bar assembly. A motor assembly may be movably connected to a backboard, wherein the motor assembly is configured to adjust the position of the backboard at a velocity. A motor may be a servomotor. A velocity may comprise from about 0.1 m/s to about 1.0 m/s. In some embodiments a velocity may comprise from about 0.2 to about 0.6 m/s. An optimum velocity may desirably produce a uniform film of a photoprotective composition on a substrate.

In some embodiments, a substrate may comprise a glass, a polymer, a skin, a metal, and a textile. A drawdown system may desirably coat a substrate comprising a substantially smooth surface. A drawdown system may desirably coat a substrate comprising a substantially uniform surface. A glass may comprise silica, quartz, fused silica, borosilicate glass, soda-lime silicate glass, phosphate glass, or combinations thereof. A polymer may comprise a low density polyethylene, a high density polyethylene, a polypropylene, a polyvinyl chloride, a polyvinyl fluoride, a polystyrene, a nylon, a polyurethane, a polytetrafluoroethylene, a resin, a polyamide, a polyester, a or combination thereof. A glass may comprise a silica, a quartz, a fused silica, a borosilicate glass, a soda-lime silicate glass, a phosphate glass, or combinations thereof. A skin may comprise a porcine skin, a human skin, a cow skin, a mouse skin, a rat skin, a frog skin, a snake skin, or combinations thereof. A substrate may have a length from about 50 mm to about 100 mm A substrate may have a width from about 10 mm to about 40 mm. In some embodiments, a substrate may have a height from about 0.5 mm to about 5 mm Drawdown Methods According to some embodiments, a drawdown method may be used to determine an SPF value of a photoprotective composition. A method of determining a quantitatively measured photoprotection of a photoprotective composition may comprise distributing the photoprotective composition in a position in between a drawdown bar and at least one substrate to produce a distributed photoprotective composition; drawing down the distributed photoprotective composition to a thickness on at least one substrate to produce a drawn down sample film; drying the drawn down sample film to produce a dried sample film; measuring a UV absorption of the dried sample film to produce a UV absorption spectrum; determining the quantitatively measured photoprotection of the photoprotective composition from the UV absorption spectrum.

A photoprotective composition may be distributed from about 10 µm to about 100 µm before at least one substrate. Distributing the photoprotective composition in the position in between the drawdown bar and the at least one substrate may comprise pumping, pipetting, syringing, pouring, positive displacing, scooping, smearing, spraying, squirting, transferring, displacing, or combinations thereof. A desirable position of a distributed photoprotective composition may facilitate drawing down of the photoprotective composition to a desirably uniform thickness on the at least one substrate. A thickness may range from about 25 µm to about 200 µm. A thickness may be about 25 µm, or about 50 µm, or about 75 µm, or about 100 µm, or about 125 µm, or about 150 µm, or about 175 µm, or about 200 µm. A thickness may be about 100 µm. In some embodiments, a thickness may allow for a formation of a photoprotective composition film, wherein the peak absorbance of the sample desirably within a range from about 1 to about 2. In some embodiments, a thickness may allow for a formation of a photoprotective composition film, wherein the peak absorbance of the sample desirably within a range from about 1 absorbance unit (AU) to about 2 AU.

A method of determining a quantitatively measured photoprotection of a photoprotective composition may comprise diluting a photoprotective composition with at least one solution to a viscosity from about 1000 cP to about 9000 cP before distributing the photoprotective composition in the position in between the drawdown bar and the at least one substrate. A photoprotective composition may comprise a sunscreen. Diluting a photoprotective composition may desirably aid in drawing down the photoprotective composition. At least one solution may water, dimethicone vinyl crosspolymer, an alkyl acrylate dimethicone crosspolymer, a cyclopentasiloxane, or combinations thereof. An amount of a diluent used may be determined by a peak absorbance of a deposited film. It may be desirable that a peak absorbance of a film achieved with a drawdown bar set at a height of about 100 µm above a substrate, wherein the peak absorption may be between 1 AU and 2 AU.

In some embodiments, drying a drawdown sample film may comprise heating the drawdown sample at a temperature from about 25° C. to about 60° C. for a time from about 10 minutes to about 120 minutes. Drying a drawdown sample may comprise heating the drawdown sample at a temperature of about 25° C., or of about 30° C., or of about 35° C., or of about 40° C., or of about 45° C., or of about 50° C., or of about 55° C., or of about 60° C. Heating a drawdown sample may be performed by an oven. Drying a sample film may comprise freeze drying, air drying, desiccant-drying, accelerated air drying, vacuum drying, vacuum thermal drying, or combinations thereof. Drying a sample film may desirably permit uniform and repeatable absorbance measurement(s) of the sample film.

According to some embodiments, a method of quantitatively measuring a photoprotection of a photoprotective composition may comprise measuring a UV absorption of a dried sample film. Measuring a UV absorption of a dried sample film may comprise measuring an absorbance at a range from about 200 nm to about 400 nm. Determining a quantitatively measured photoprotection of a photoprotective composition may comprise integrating a UV absorption spectrum obtained by measuring a UV absorption of a dried sample film. An integration value may directly correlate to an SPF value. An SPF value may be calculated from an integration of a UV absorption spectrum.

Spray Systems

The present disclosure relates, according to some embodiments, to methods of determining a quantitatively measured photoprotection of a photoprotective composition, wherein the methods comprise a spray method that may be performed by a spray system.

According to some embodiments, a spray system for quantitatively measuring photoprotection of a photoprotective composition, the spray system may comprise at least one substrate; at least one sample container configured to contain the photoprotective composition; at least one spray gun in fluid communication with the at least one sample container, wherein the at least one spray gun is configured to spray at least one coat of the photoprotective composition on the at least one substrate; a platform substantially perpendicular to the at least one spray gun, wherein the platform is configured to support and adjust the position of the at least one substrate; a motor assembly movably connected to the platform, wherein the motor assembly is configured to adjust the position of the platform at a velocity; a UV absorption spectrophotometer configured to determine the SPF of the at least one coat of the photoprotective composition.

A spray system for quantitatively measuring photoprotection of a photoprotective composition may comprise a vacuum chuck configured to affix the at least one substrate to the platform, a first compressor configured to provide air pressure to the at least one sample container, a second compressor configured to provide air pressure to the at least one spray gun, a spray system position guide configured to adjust the position of the platform, a switch configured control the position of the at least one spray gun, and a slide way configured to provide a path for the platform to move.

In some embodiments, a substrate may comprise a glass, a polymer, a skin, a metal, and a textile. A spray system may desirably coat a substrate comprising a substantially non-uniform surface. A spray system may desirably coat substrate comprising a substantially rough surface. A spray system may desirably coat a substrate comprising a substantially smooth surface. A spray system may desirably coat a substrate comprising a substantially uniform surface. A glass may comprise silica, quartz, fused silica, borosilicate glass, soda-lime silicate glass, phosphate glass, or combinations thereof. A polymer may comprise a low density polyethylene, a high density polyethylene, a polypropylene, a polyvinyl chloride, a polyvinyl fluoride, a polystyrene, a nylon, a polyurethane, a polytetrafluoroethylene, a resin, a polyamide, a polyester, or combinations thereof. A glass may comprise a silica, a quartz, a fused silica, a borosilicate glass, a soda-lime silicate glass, a phosphate glass, or combinations thereof. A skin may comprise a porcine skin, a human skin, a cow skin, a mouse skin, a rat skin, a frog skin, a snake skin, or combinations thereof. A substrate may have a length from about 50 mm to about 100 mm A substrate may have a width from about 10 mm to about 40 mm. In some embodiments, a substrate may have a height from about 0.5 mm to about 5 mm.

According to some embodiments, a motor assembly may be movably connected to a platform, wherein the platform is configured to support and adjust the position of the at least one substrate. A motor assembly may adjust the position of a platform and therefore the position of at least one substrate at a velocity from about 0.1 m/s to about 1.0 m/s. A velocity may comprise from about 0.3 to about 0.7 m/s. An optimum velocity may desirably produce a uniform film of a photoprotective composition on a substrate.

Spray Methods

The present disclosure relates, according to some embodiments, to methods of determining a quantitatively measured photoprotection of a photoprotective composition. A method of determining a quantitatively measured photoprotection of a photoprotective composition may comprise spraying at least one coat of the photoprotective composition to a thickness on at least one surface of a substrate to produce a spray coated substrate sample; drying the spray coated substrate sample to produce a dried sample film; measuring a UV absorption of the dried sample film to produce a UV absorption spectrum; determining the quantitatively measured photoprotection of the photoprotective composition from the UV absorption spectrum.

A method of quantitatively measuring photoprotection of a photoprotective composition may comprise diluting the photoprotective composition with at least one solution to a viscosity from about 1000 cP to about 9000 cP before spraying the at least one coat of the photoprotective composition on the at least one surface of the substrate. Diluting a photoprotective composition may desirably aid in spraying the photoprotective composition. At least one solution may water, dimethicone vinyl crosspolymer, an alkyl acrylate dimethicone crosspolymer, a cyclopentasiloxane, or combinations thereof.

According to some embodiments, a method of quantitatively measuring photoprotection of a photoprotective composition may comprise spraying. Spraying may comprise any form of depositing material on a surface including misting, atomizing, fogging, diffusing, or combinations thereof. Various spray cones may be used to spray including a full cone, hollow cone, flat stream cone, or combinations thereof.

In some embodiments, a method of quantitatively measuring photoprotection of a photoprotective composition may comprise spraying at least one coat of the photoprotective composition to a thickness on at least one surface of a substrate to produce a spray coated substrate sample. A thickness may range from about 25 µm to about 200 µm. A thickness may be about 25 µm, or about 50 µm, or about 75 µm, or about 100 µm, or about 125 µm, or about 150 µm, or about 175 µm, or about 200 µm. A thickness may be about 100 µm. In some embodiments, a thickness may allow for a formation of a photoprotective composition film, wherein the absorbance of the sample desirably within a range from about 1 to about 2. In some embodiments, a thickness may allow for a formation of a photoprotective composition film, wherein the absorbance of the sample desirably within a range from about 1 absorbance unit (AU) to about 2 AU.

In some embodiments, drying a sample film may comprise heating the sample film at a temperature from about 25° C. to about 60° C. for a time from about 10 minutes to about 120 minutes. Drying a sample film may comprise heating the sample film at a temperature of about 25° C., or of about 30° C., or of about 35° C., or of about 40° C., or of about 45° C., or of about 50° C., or of about 55° C., or of about 60° C. Heating a sample film may be performed by an oven. Drying a sample film may comprise freeze drying, air drying, desiccant-drying, accelerated air drying, vacuum drying, vacuum thermal drying, or combinations thereof. Drying a sample film may desirably permit uniform and repeatable absorbance measurement(s) of the sample film.

According to some embodiments, a method of quantitatively measuring a photoprotection of a photoprotective composition may comprise measuring a UV absorption of a dried sample film. Measuring a UV absorption of a dried sample film may comprise measuring an absorbance at a range from about 200 nm to about 400 nm. Determining a quantitatively measured photoprotection of a photoprotective composition may comprise integrating a UV absorption spectrum obtained by measuring a UV absorption of a dried sample film. An integration value may directly correlate to an SPF value. An SPF value may be calculated from an integration of a UV absorption spectrum.

Calculating an SPF from a UV Absorption Spectrum

In some embodiments, a method of quantitatively measuring a photoprotection of a photoprotective composition may comprise calculating an SPF from a UV absorption spectrum. In some embodiments, an integral (i.e., area under a curve) of a UV absorption spectrum may be directly proportional to an SPF.

Photoprotective Compositions

The present disclosure relates, in some embodiments, to systems and methods for determining an SPF for photoprotective compositions. A photoprotective composition may comprise a composition that may provide a filter for UV radiation. A photoprotective composition may protect a substrate from UV damage caused by both UVA (i.e., 320-400 nm) and UVB (i.e., 290-320 nm) radiation. For humans and animals, a photoprotective composition may prevent UV damage that may cause premature skin aging, eye damage (e.g., cataracts), and skin cancer. A photoprotective composition may prevent a degradation caused by UV radiation to materials such as polymers, inks, dyes, glass, metals, paints, pesticides, herbicides, pharmaceuticals, and foodstuffs. A photoprotective composition may comprise a sunscreen. A photoprotective composition may comprise a sunscreen and at least one solution, wherein the at least one solution comprises water, dimethicone vinyl crosspolymer, an alkyl acrylate dimethicone crosspolymer, a cyclopentasiloxane, or combinations thereof. A photoprotective composition may also comprise a personal care product (e.g., lotion, cream, moisturizer, lip balm, etc.).

Specific Example Embodiments

Figure 2:
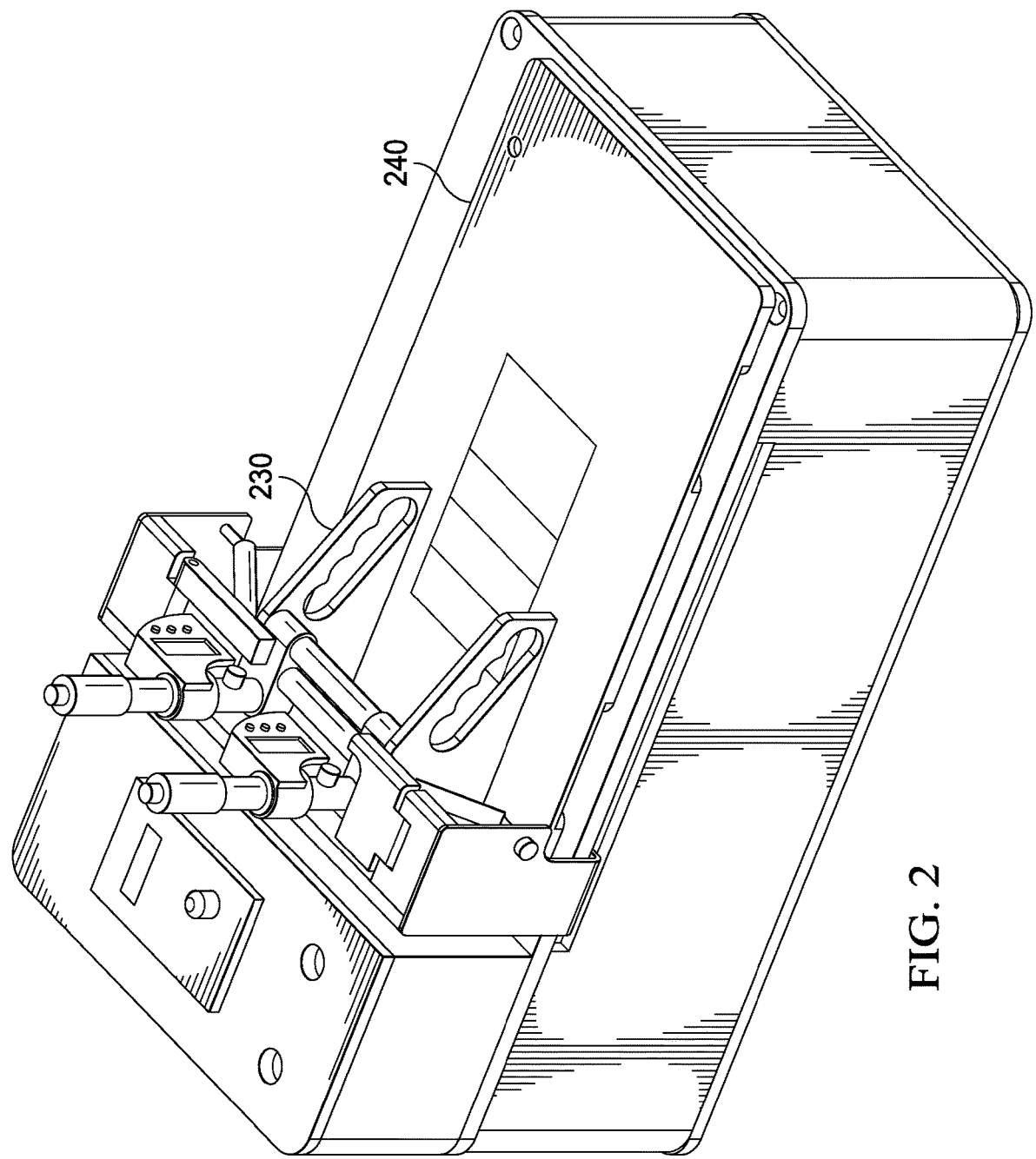
FIG. 2 illustrates an isometric view of a drawdown system according to a specific example embodiment of the disclosure.
Figure 3:
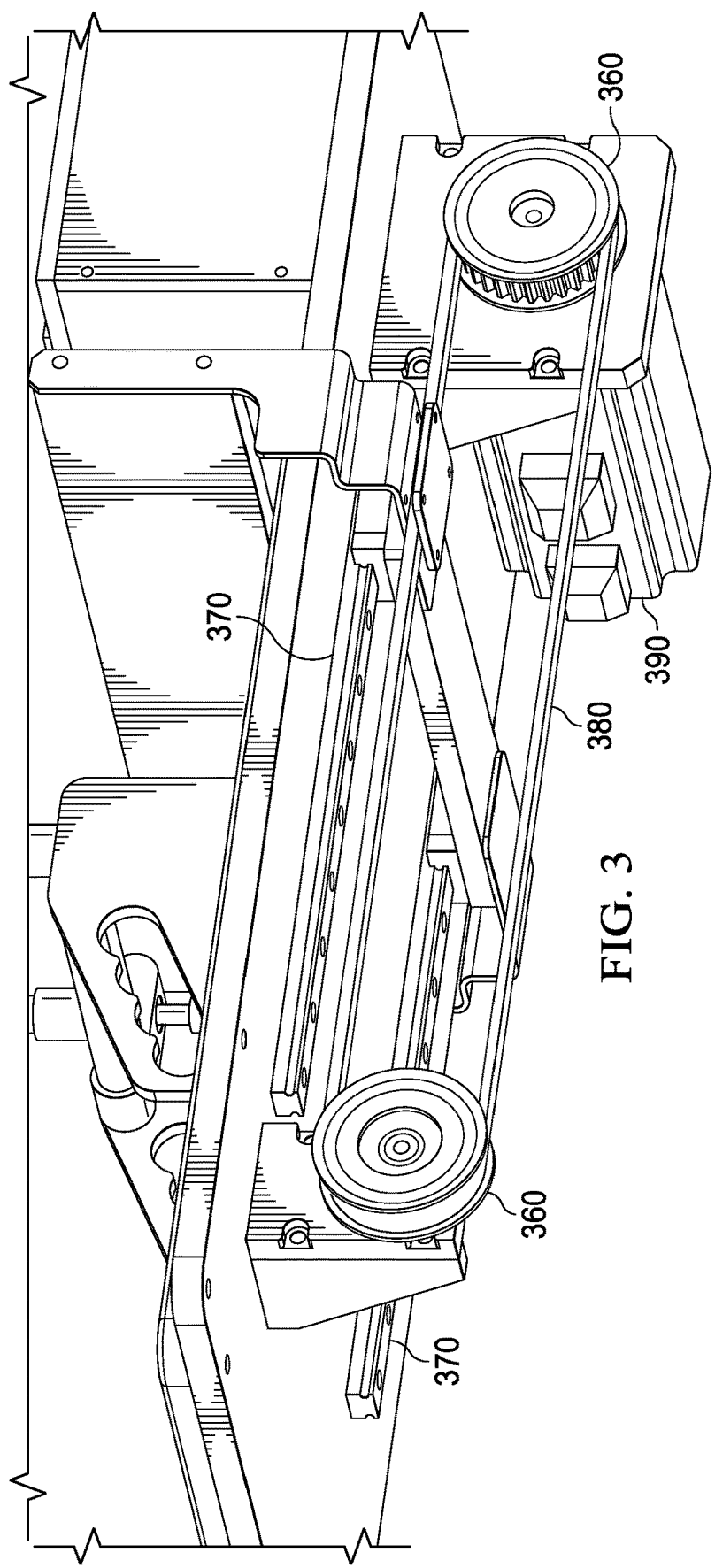
FIG. 3 illustrates an isometric view of a servo motor of a drawdown system according to a specific example embodiment of the disclosure.

Specific example embodiments of a method or system for quantitatively measuring photoprotection of a photoprotective composition are illustrated in FIGS. 1-14. FIG. 1 illustrates an isometric view of a drawdown system comprising a backboard 120, a processor 110, a drawdown bar assembly 130, a platform 140, and a position guide 150. FIG. 2 illustrates an isometric view of a drawdown system according to a specific example embodiment of the disclosure, wherein the drawdown system comprises a drawdown bar assembly 230 and a platform 240. FIG. 3 illustrates an isometric view of a servo motor of a drawdown system comprising at least one synchronous wheel 360, at least one slideway 370, at least one synchronous belt 380, and at least one servo motor 390.

Figure 4A:
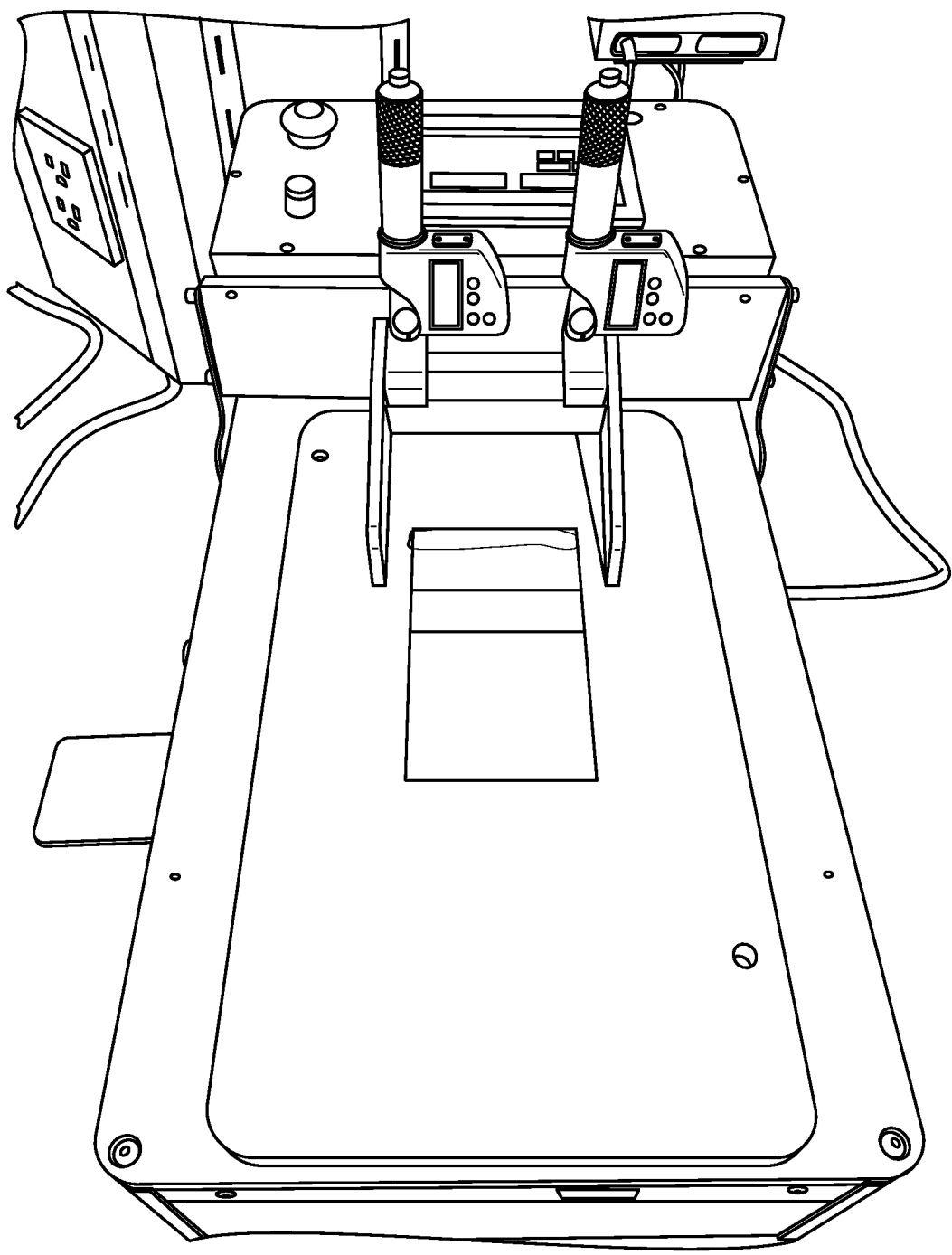
FIG. 4A illustrates a starting position of a drawdown system according to a specific example embodiment of the disclosure.
Figure 4B:
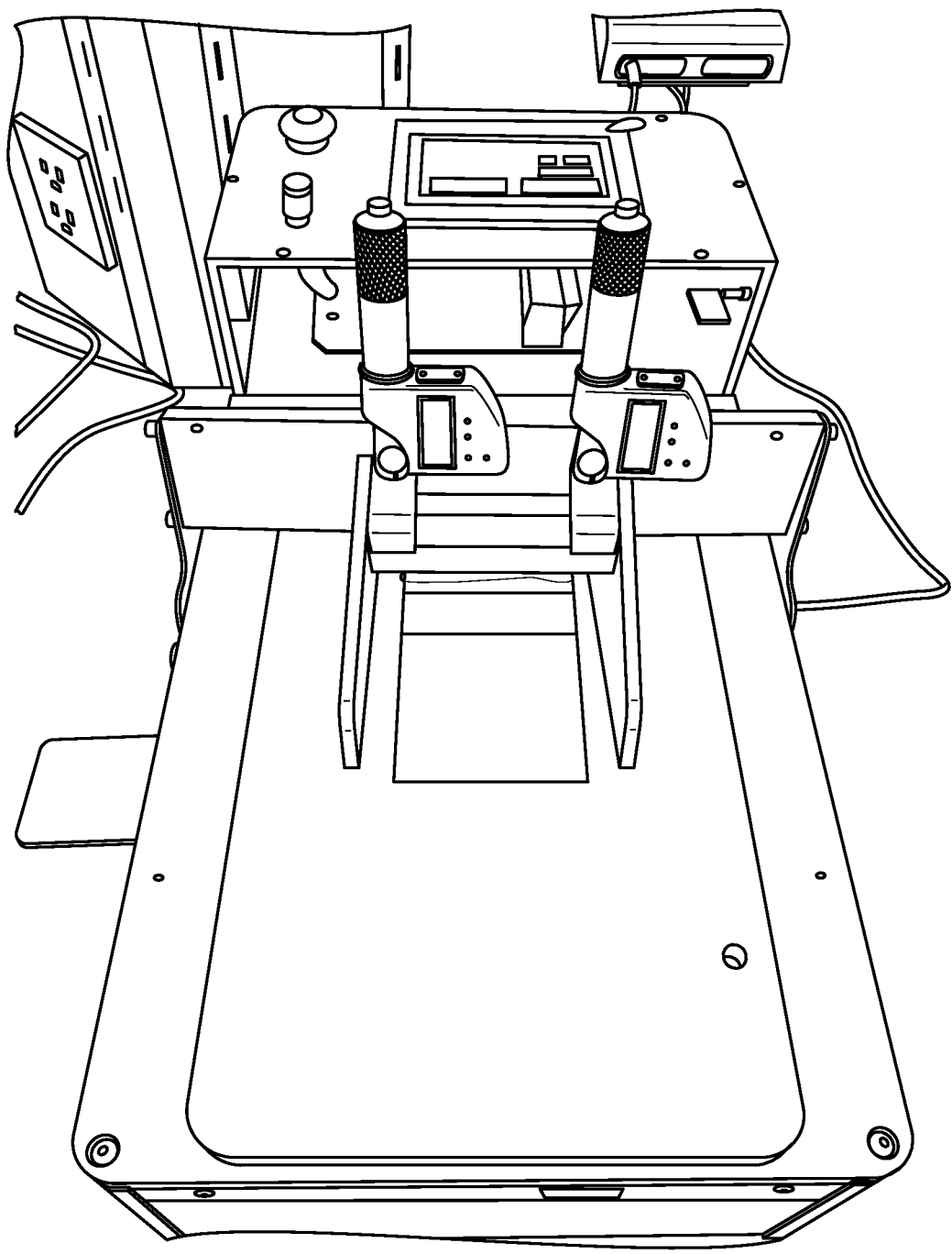
FIG. 4B illustrates an intermediate position of a drawdown system according to a specific example embodiment of the disclosure.
Figure 4C:
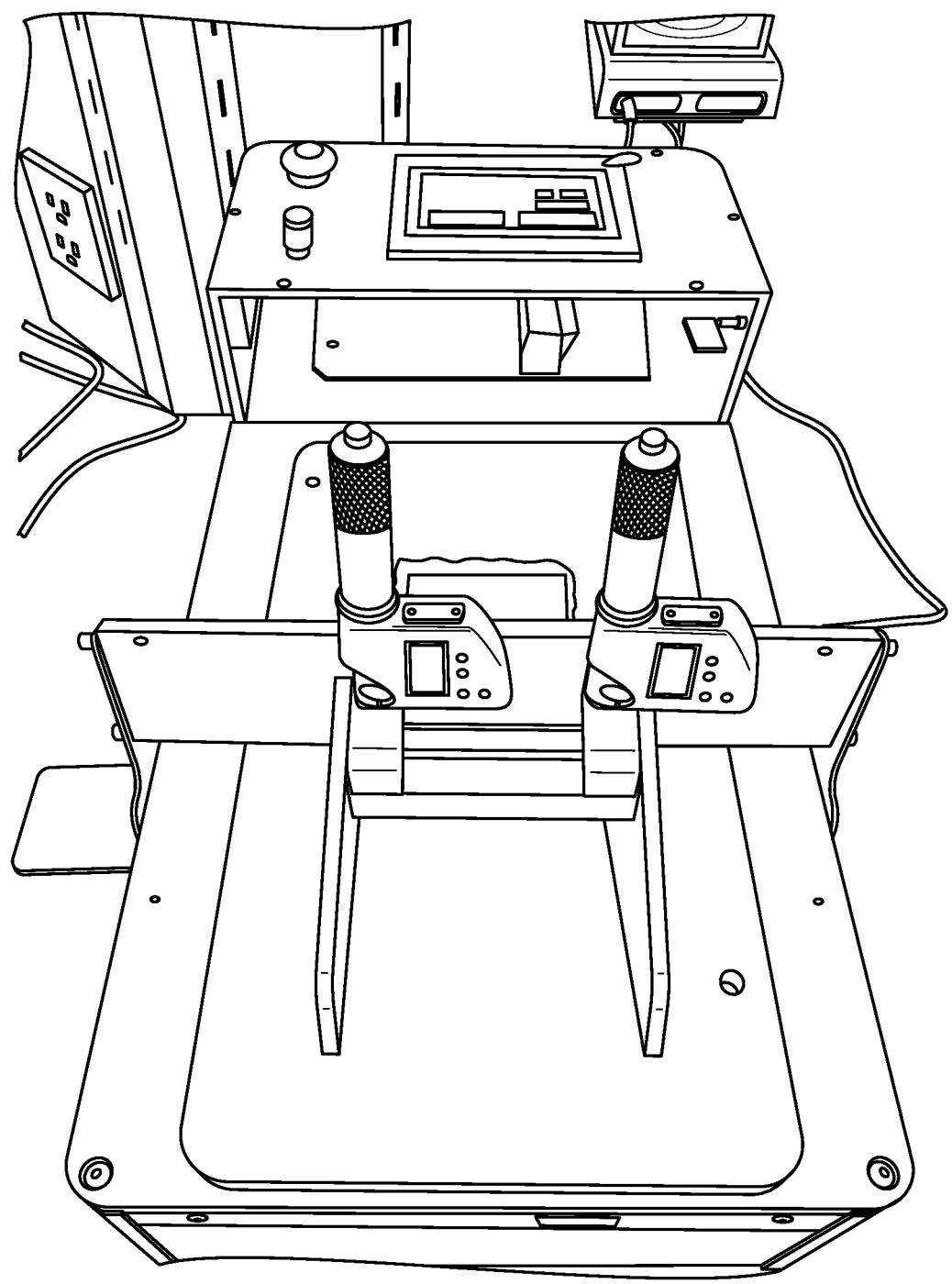
FIG. 4C illustrates an intermediate position of a drawdown system according to a specific example embodiment of the disclosure.
Figure 4D:
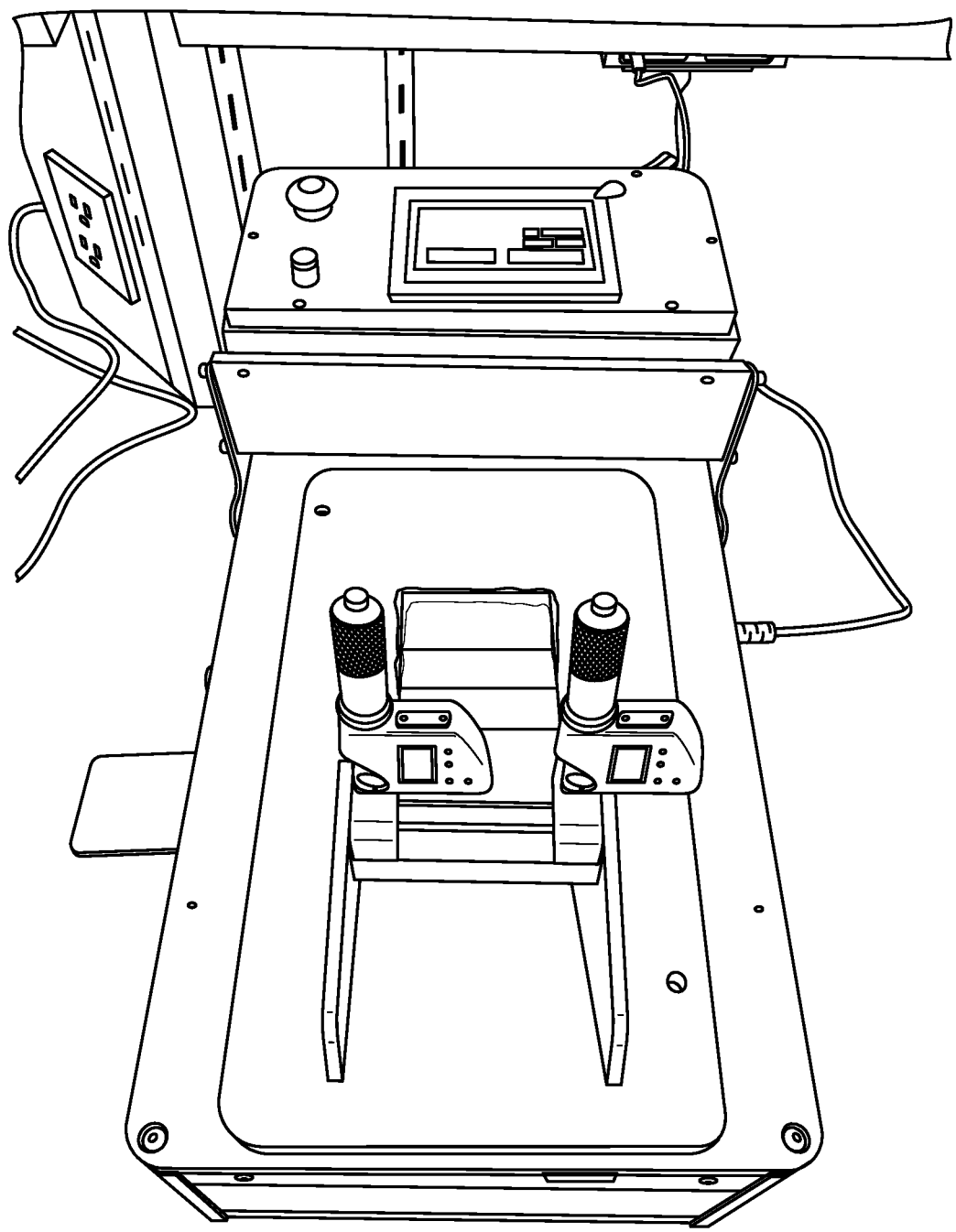
FIG. 4D illustrates an advanced position of a drawdown system according to a specific example embodiment of the disclosure.
Figure 5:
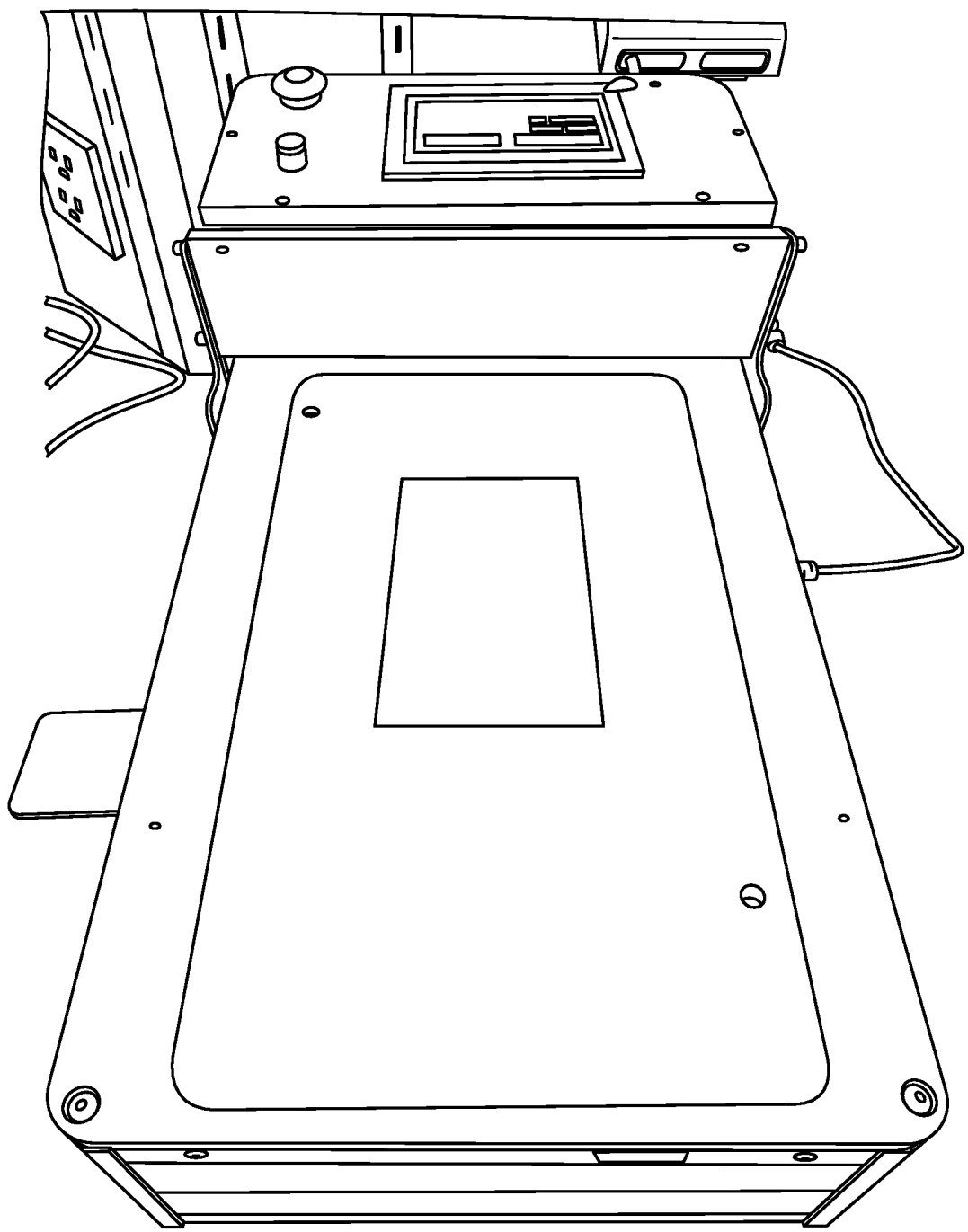
FIG. 5 illustrates an alternative configuration of a drawdown system according to a specific example embodiment of the disclosure.
Figure 6A:
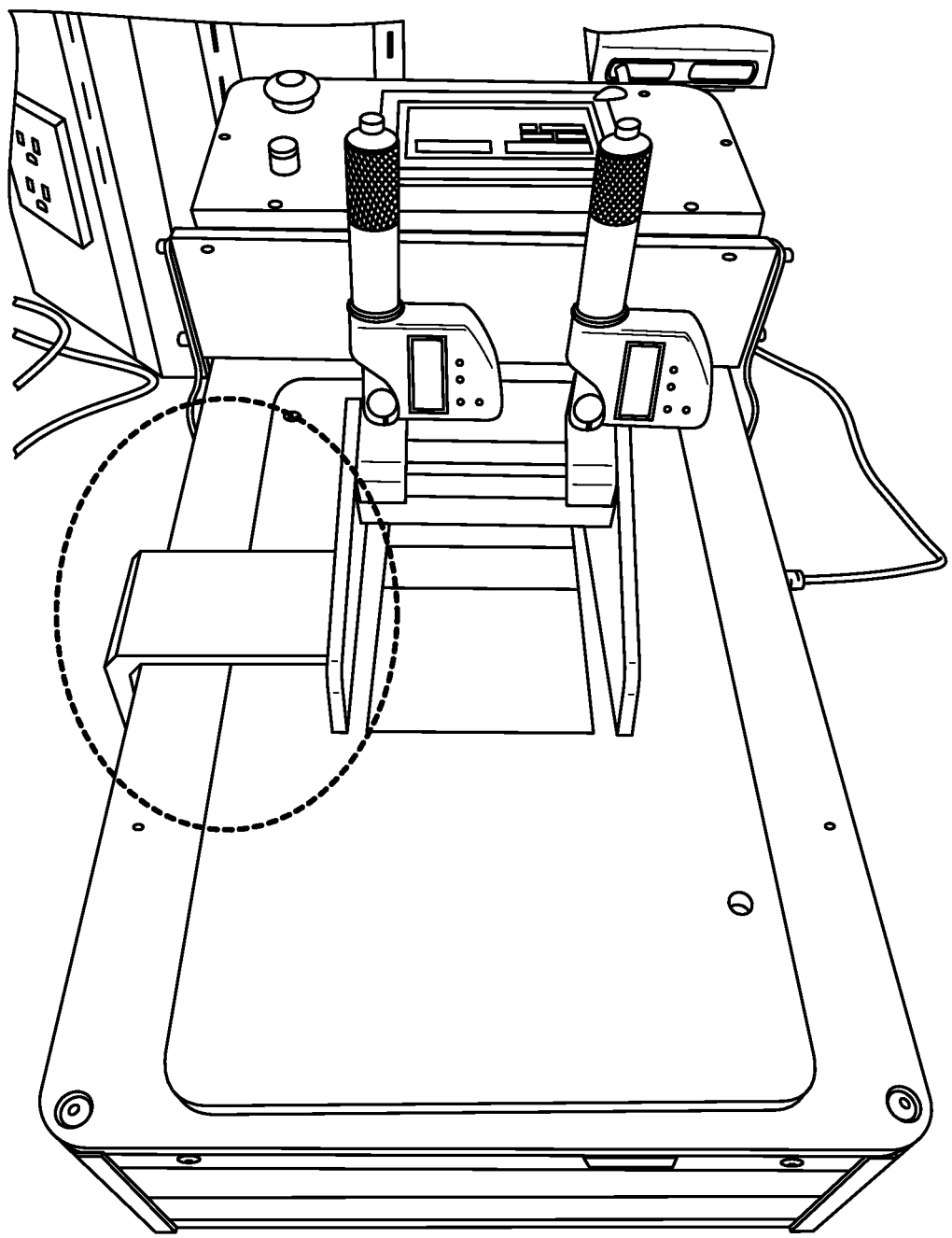
FIG. 6A illustrates an alternative direction position guide of a drawdown system according to a specific example embodiment of the disclosure.
Figure 6B:
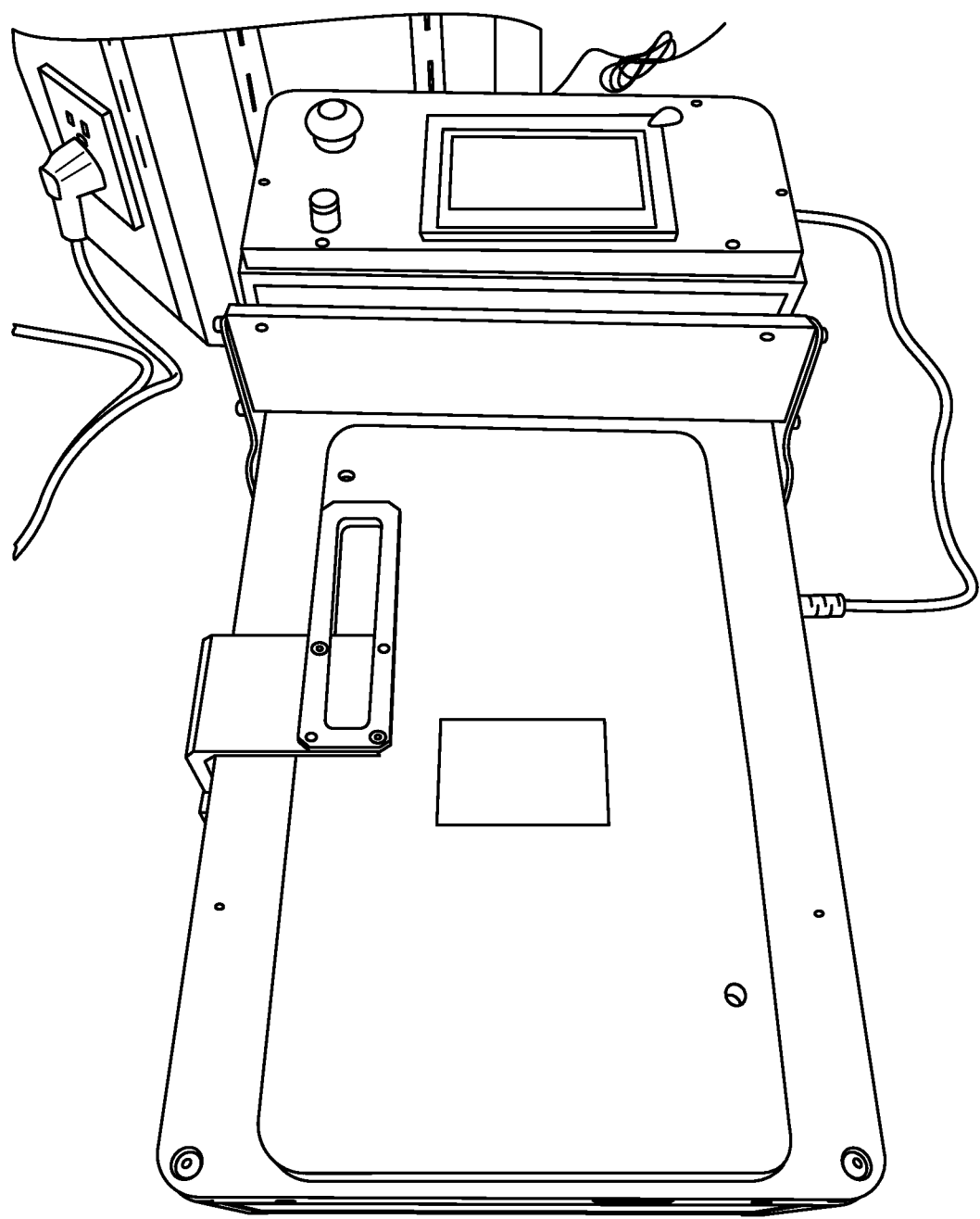
FIG. 6B illustrates an alternative direction position guide with the drawdown assembly removed of a drawdown system according to a specific example embodiment of the disclosure.
Figure 7A:
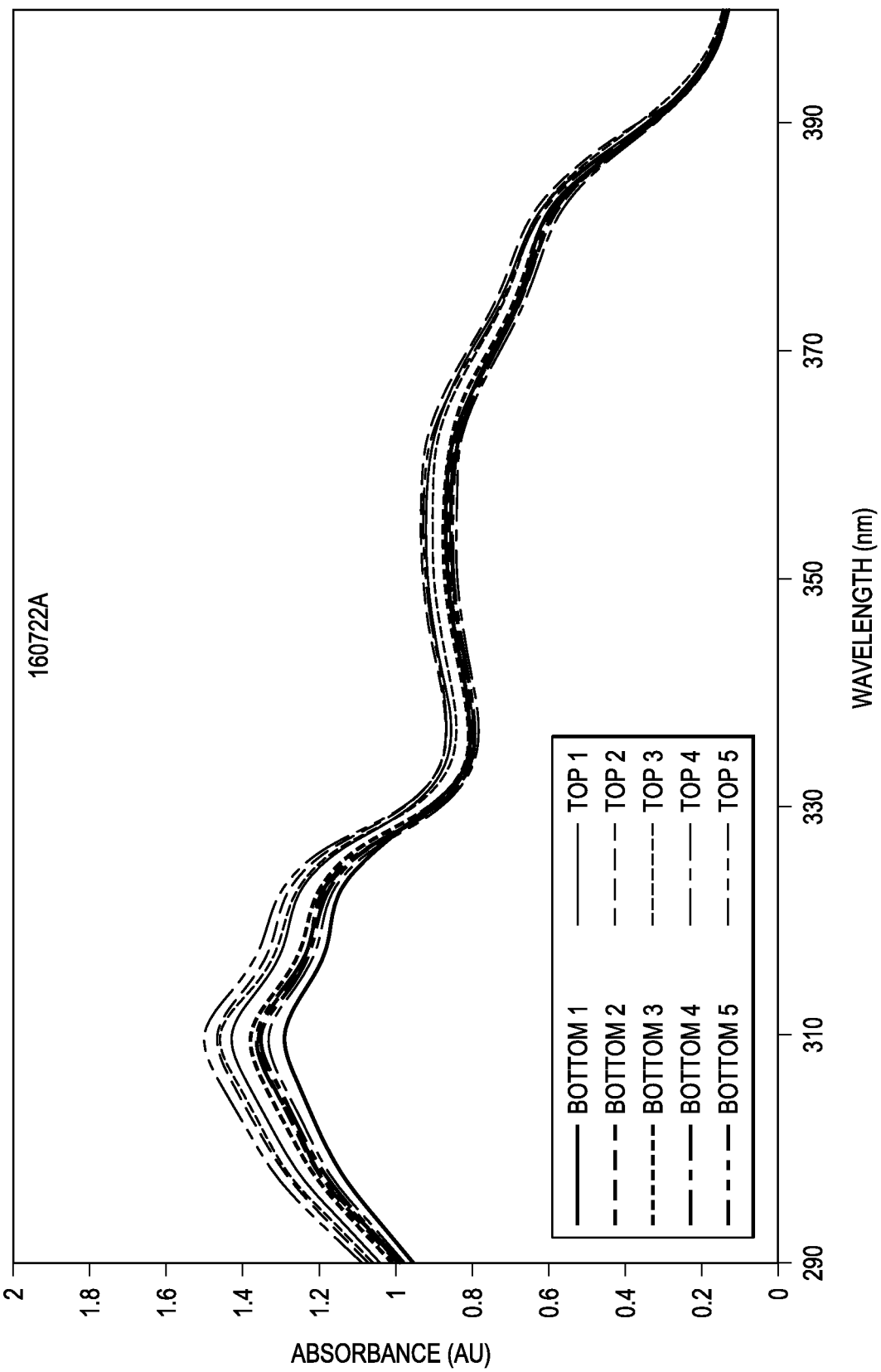
FIG. 7A illustrates an absorbance spectrum of a sample for a drawdown system according to a specific example embodiment of the disclosure.
Figure 7B:
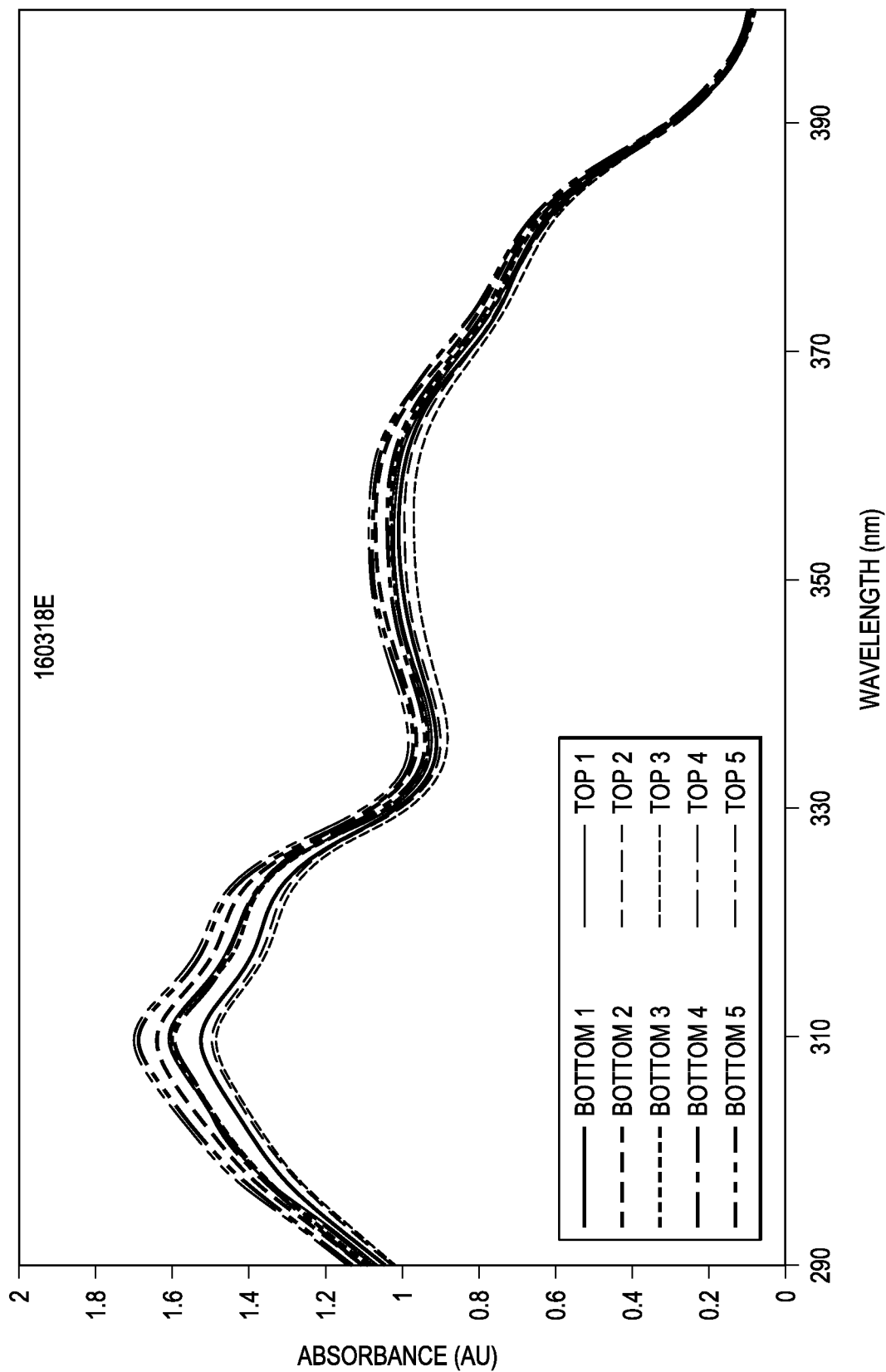
FIG. 7B illustrates an absorbance spectrum of a sample for a drawdown system according to a specific example embodiment of the disclosure.
Figure 7D:
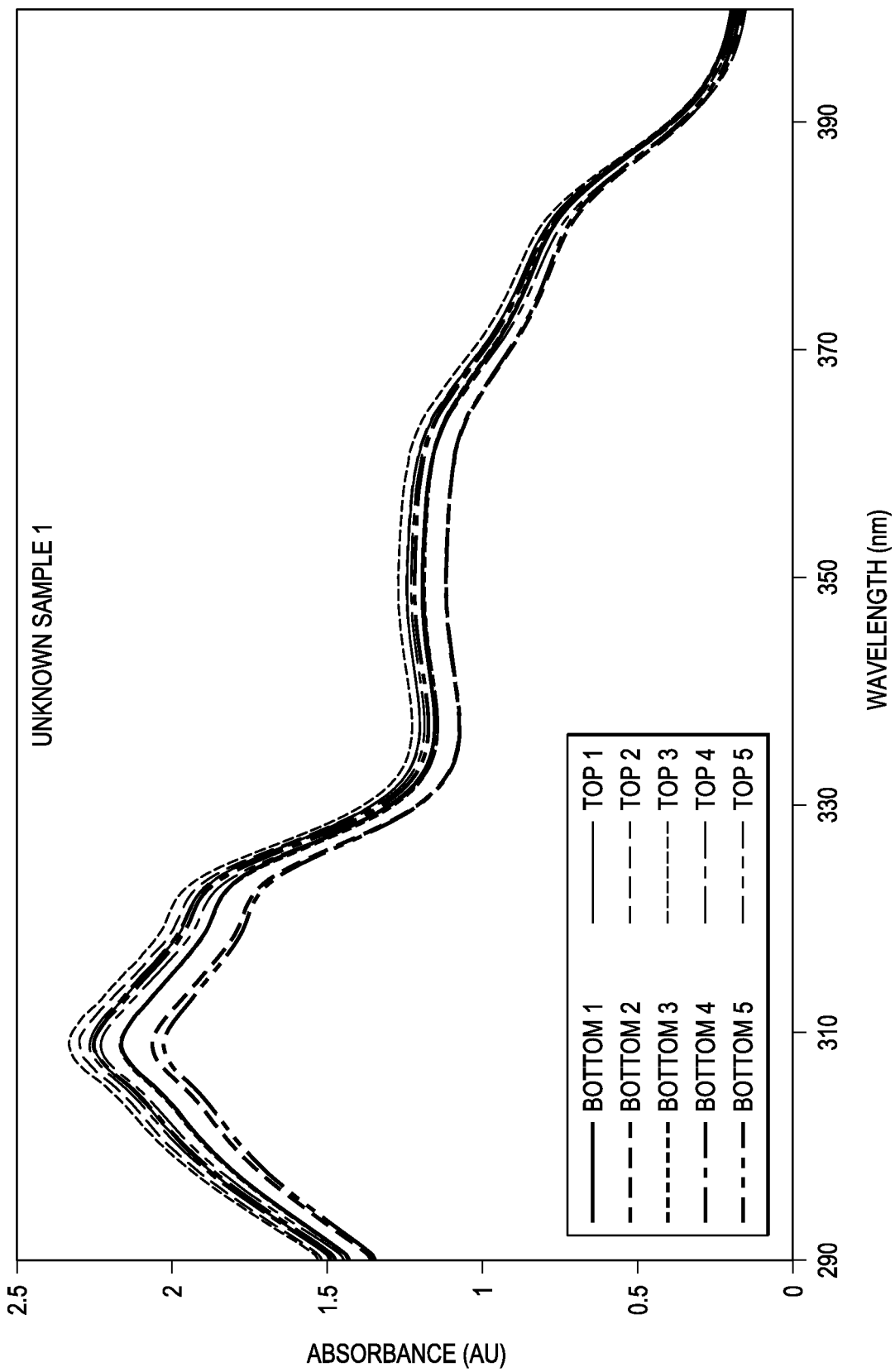
FIG. 7D illustrates an absorbance spectrum of a sample for a drawdown system according to a specific example embodiment of the disclosure.
Figure 7E:
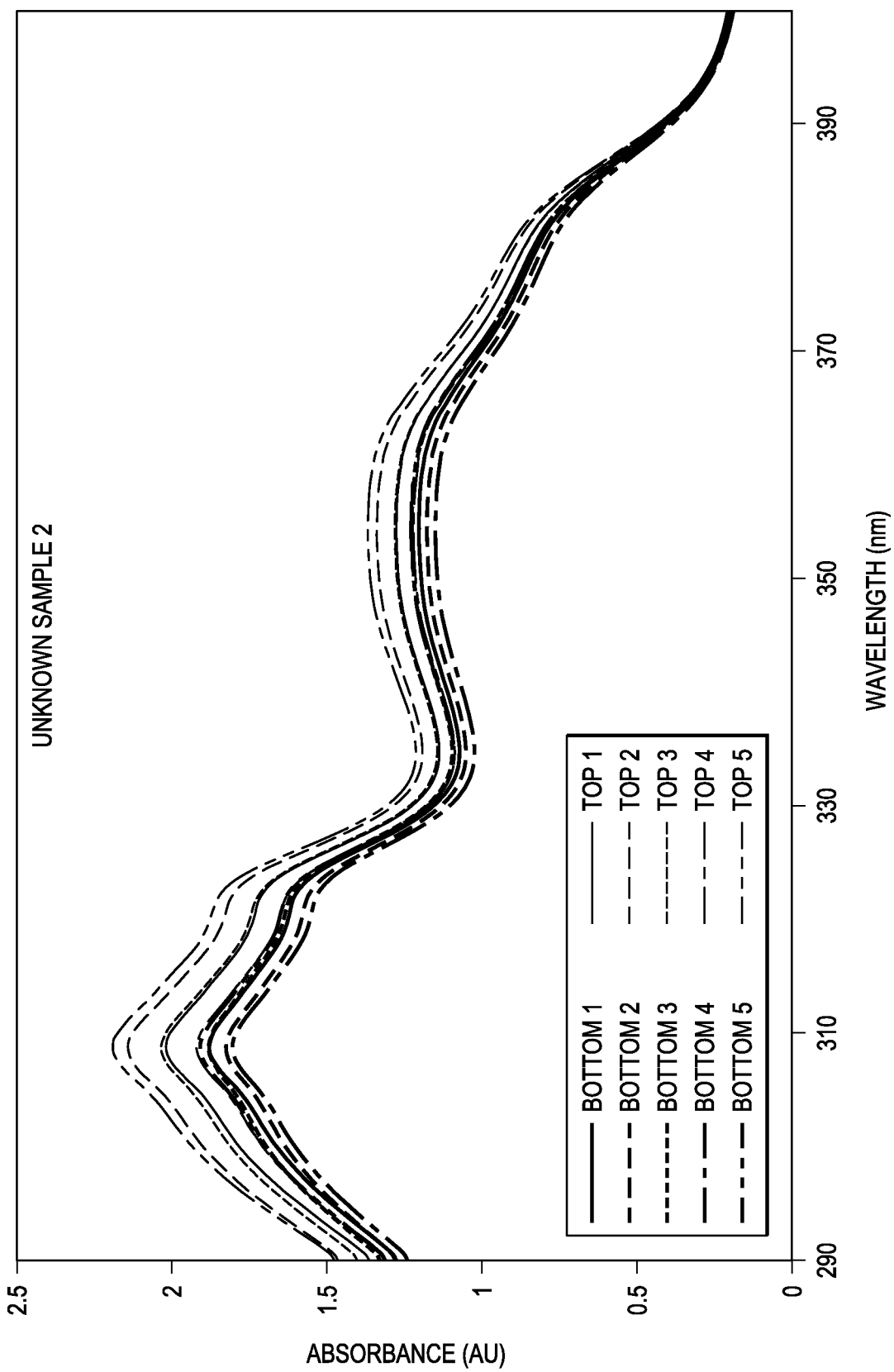
FIG. 7E illustrates an absorbance spectrum of a sample for a drawdown system according to a specific example embodiment of the disclosure.

According to some embodiments, FIG. 4A illustrates a starting position of a drawdown system, FIG. 4B illustrates an intermediate position of a drawdown system; FIG. 4C illustrates an intermediate position of a drawdown system; and FIG. 4D illustrates an advanced position of a drawdown system according to a specific example embodiment of the disclosure. FIG. 5 illustrates an alternative configuration of a 10 drawdown system, wherein the drawdown bar assembly has been removed. FIGS. 6A and 6B illustrate alternative configurations of a drawdown system, wherein alternative position guides may be used.

FIGS. 7A-7E illustrate absorbance spectra of samples for a drawdown system, wherein an SPF may be determined for each sample by integrating the area under each spectrum. After coating a glass plate with at least one photoprotective composition to produce a sample film, the sample film may be dried in an oven and a UV absorption may be measured of the dried sample film to produce an absorption spectrum.

Figure 8:
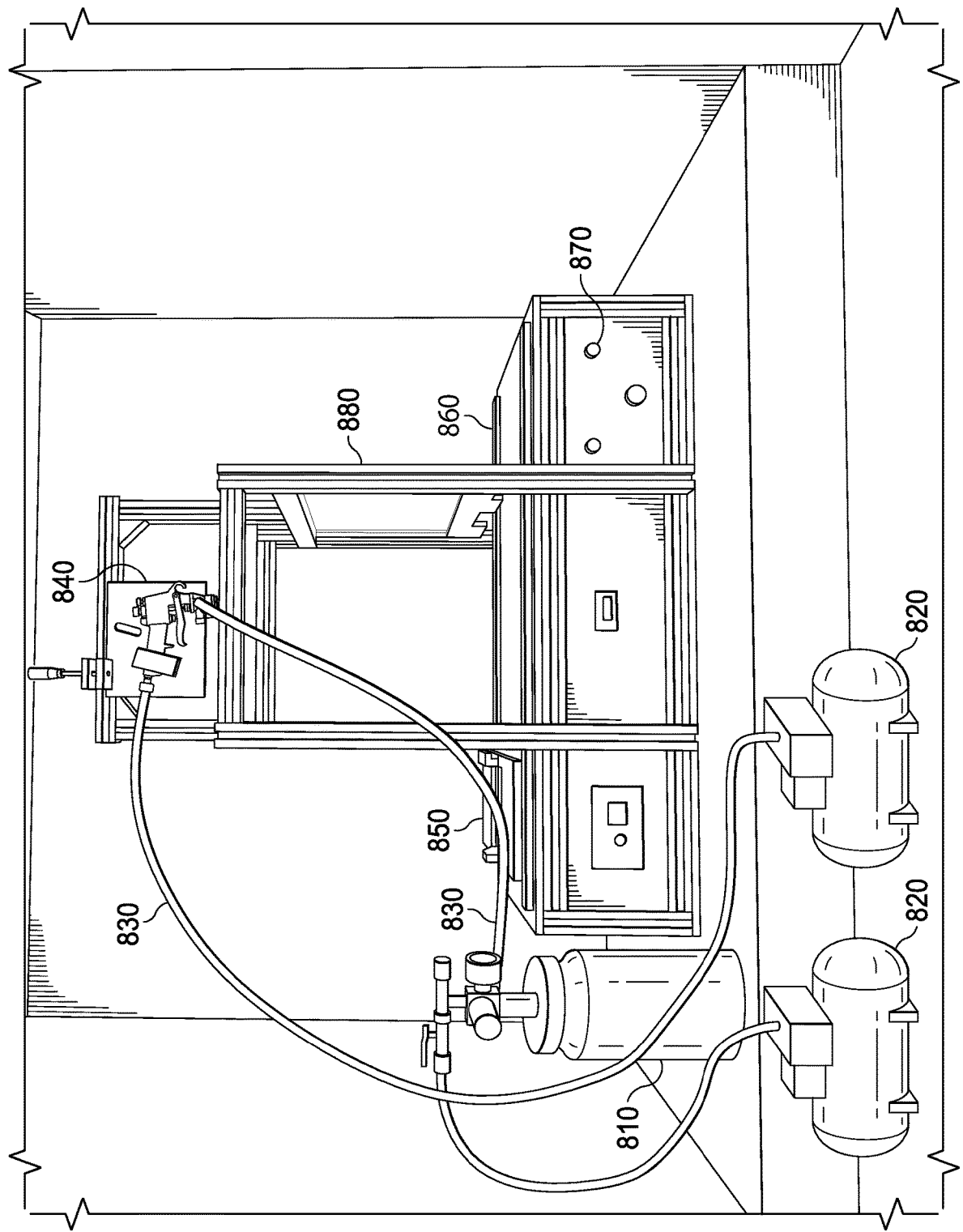
FIG. 8 illustrates an isometric view of a spray system according to a specific example embodiment of the disclosure.
Figure 9A:
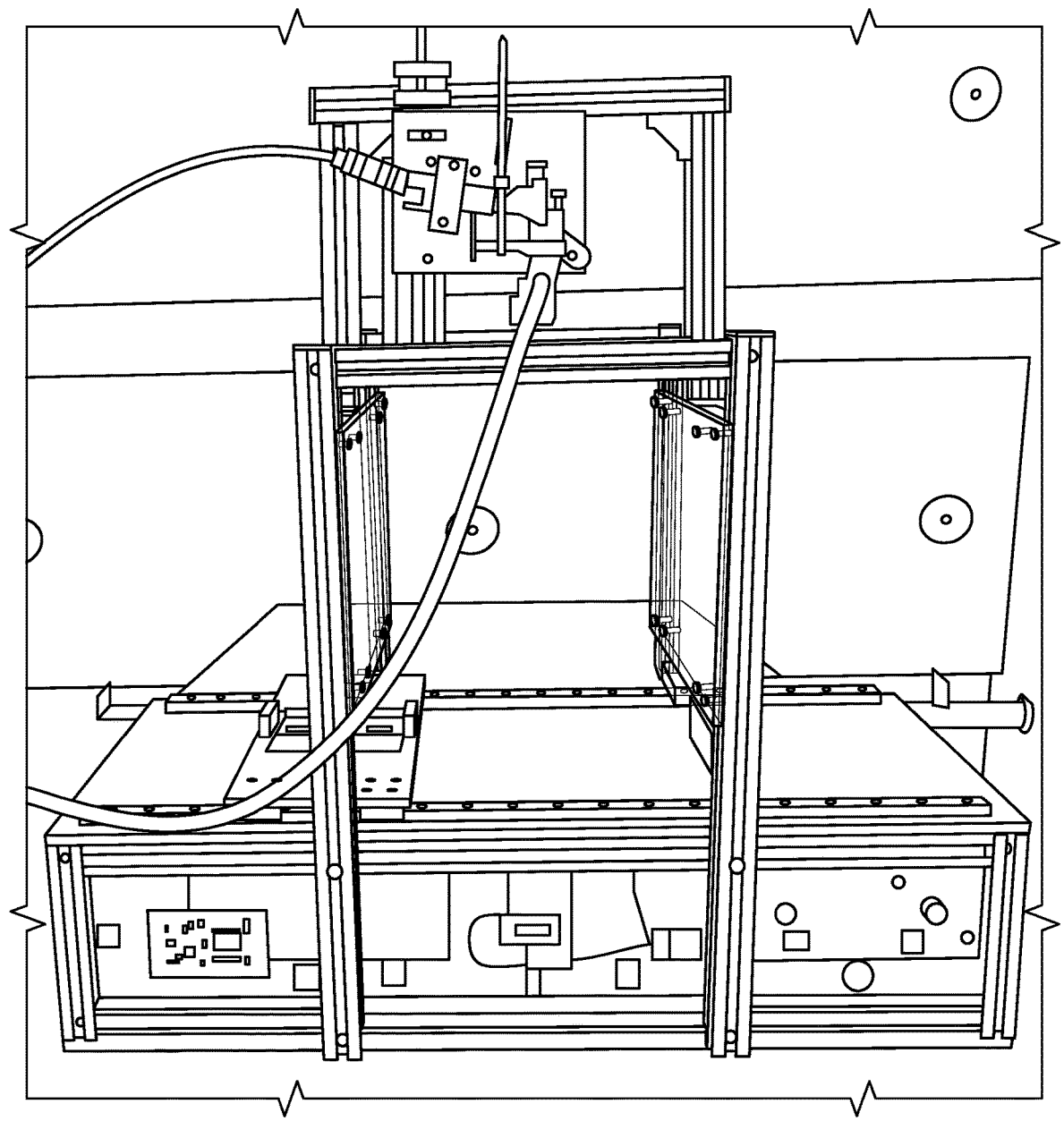
FIG. 9A illustrates a starting position of a spray system according to a specific example embodiment of the disclosure.
Figure 9B:
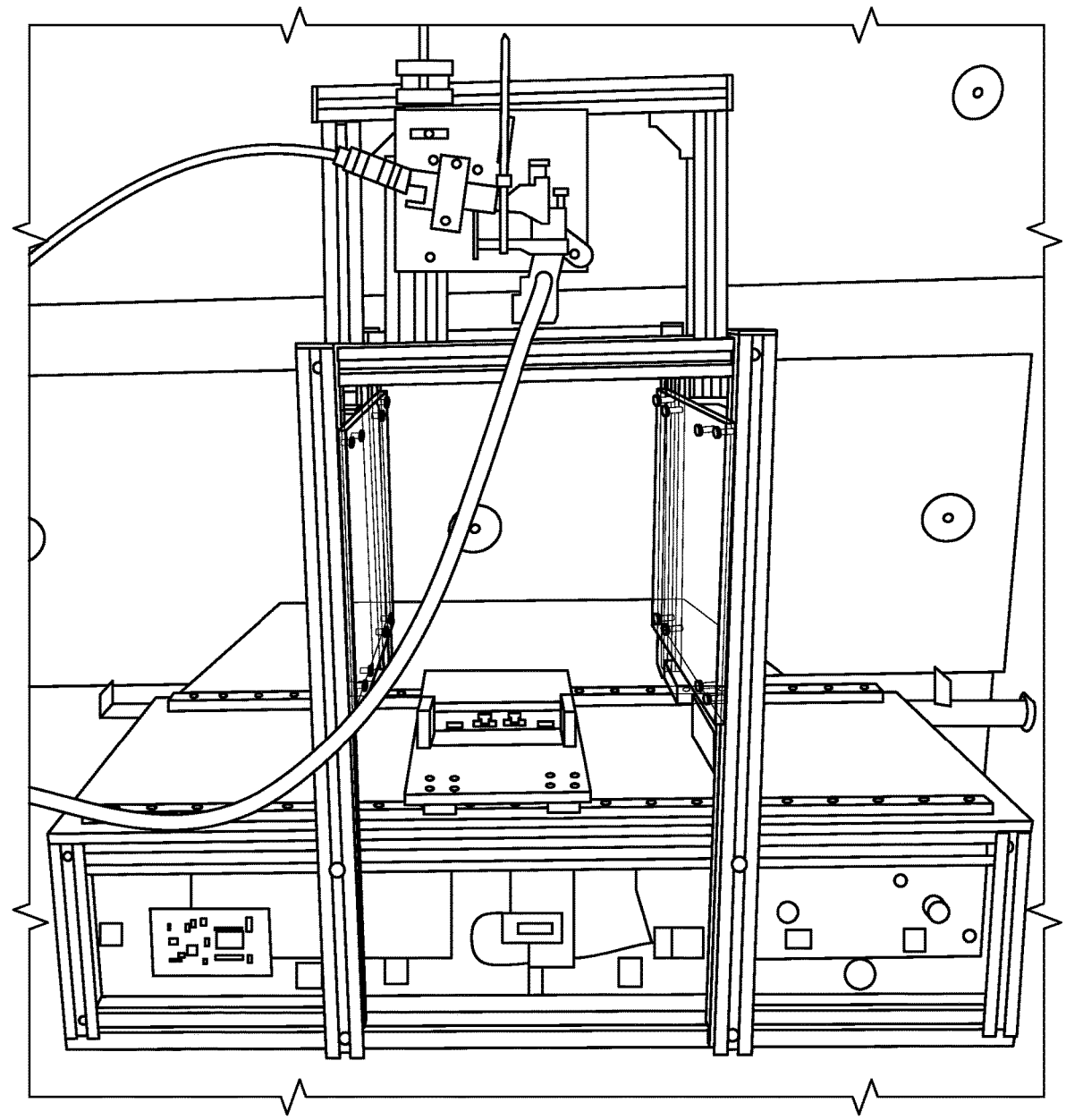
FIG. 9B illustrates an intermediate position of a spray system according to a specific example embodiment of the disclosure.
Figure 9C:
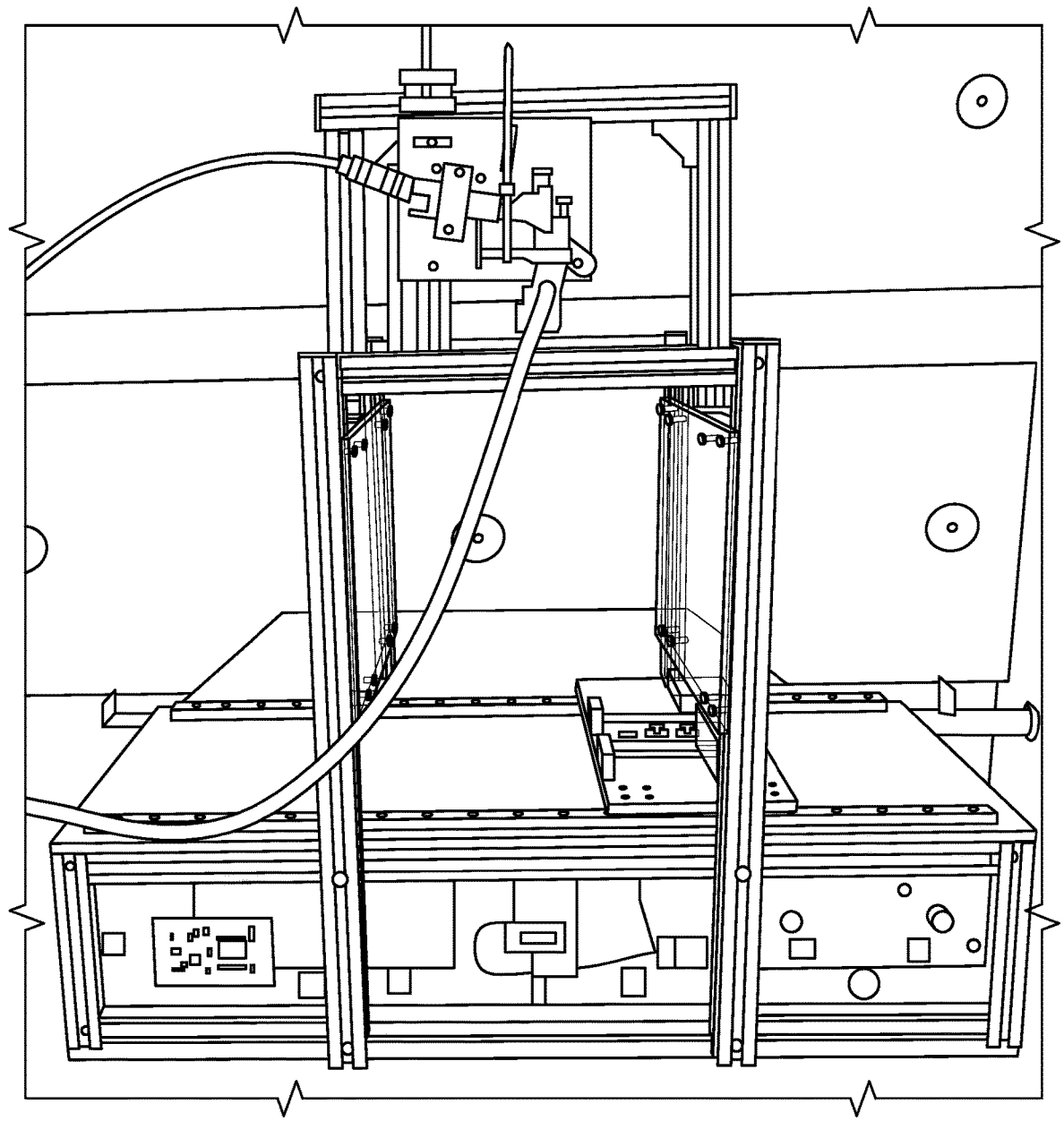
FIG. 9C illustrates an advanced position of a spray system according to a specific example embodiment of the disclosure.

FIG. 8 illustrates an isometric view of a spray system comprising at least one sample container 810, at least one air compressor 820, at least one air hose 830, a spray gun 840, a platform 850, a slide way 860, a motor assembly 870, and a frame 880. FIGS. 9A-9C illustrate a starting, intermediate, and advanced position of a spray system according to a specific example embodiment. A platform supporting at least one substrate may pass at least one spray gun at least one time, wherein the spray gun may coat the at least one substrate with at least one photoprotective composition.

Figure 10:
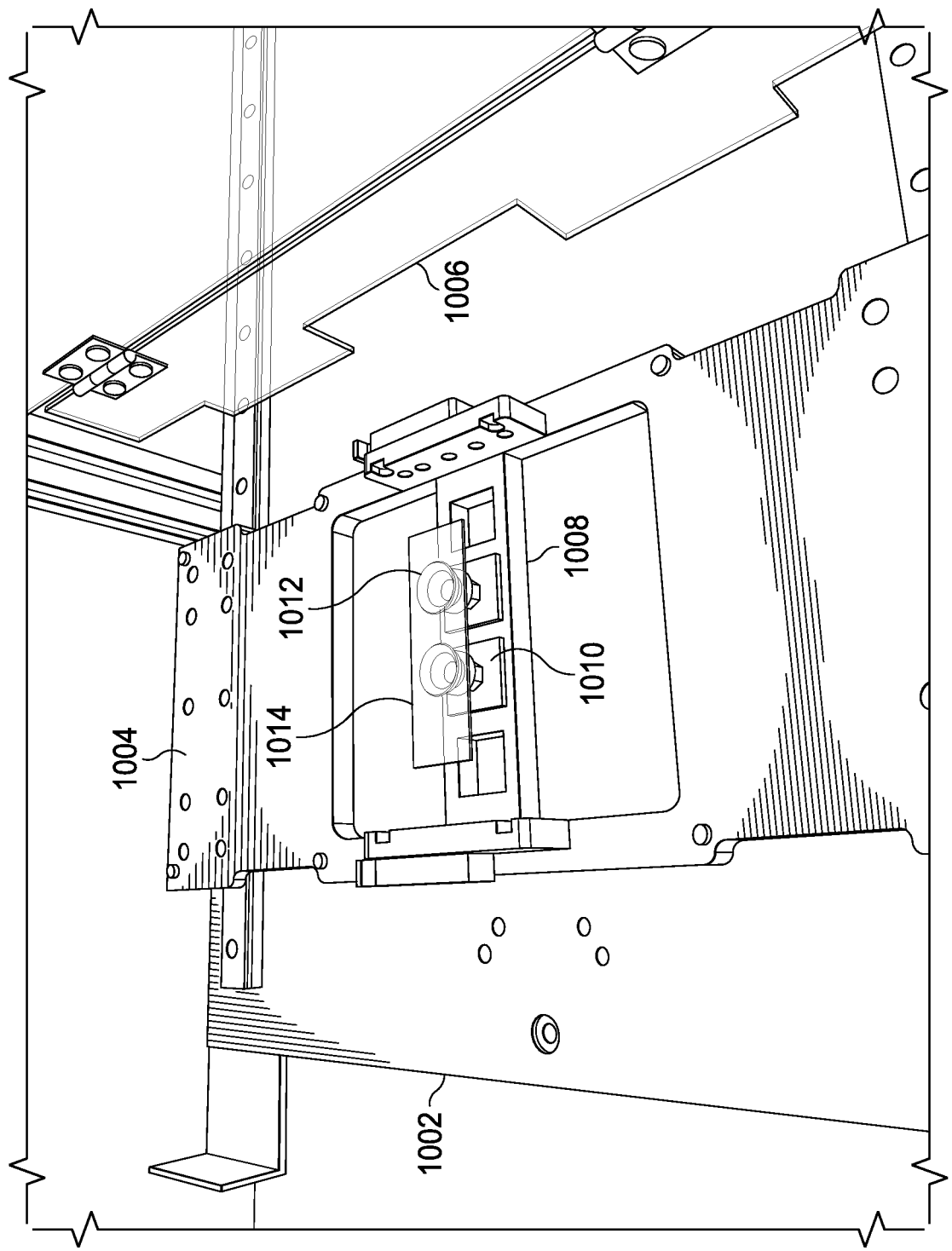
FIG. 10 illustrates an isometric view of a platform of a spray system according to a specific example embodiment of the disclosure.
Figure 11:
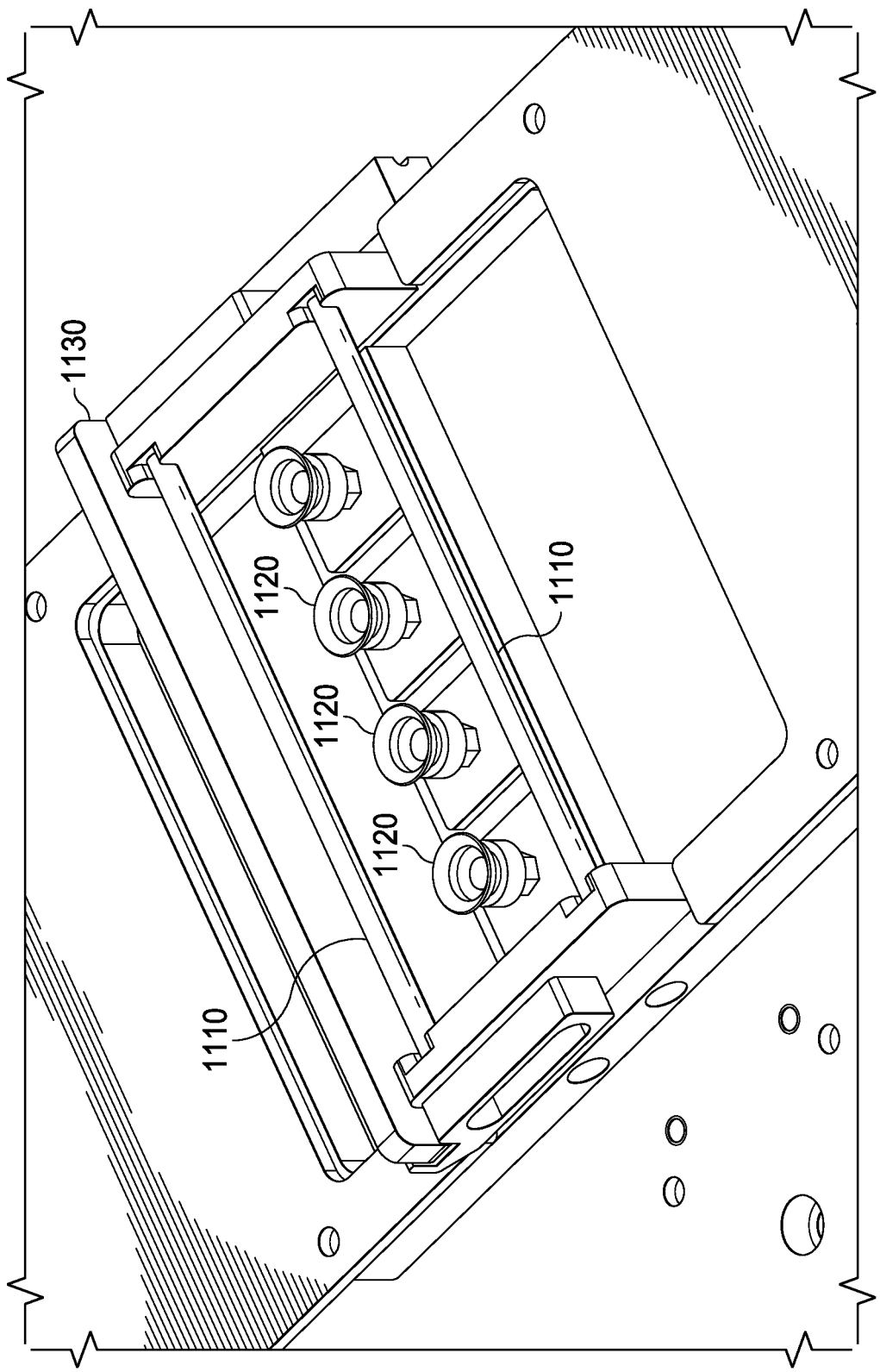
FIG. 11 illustrates an isometric view of a vacuum chuck of a spray system according to a specific example embodiment of the disclosure.
Figure 12:
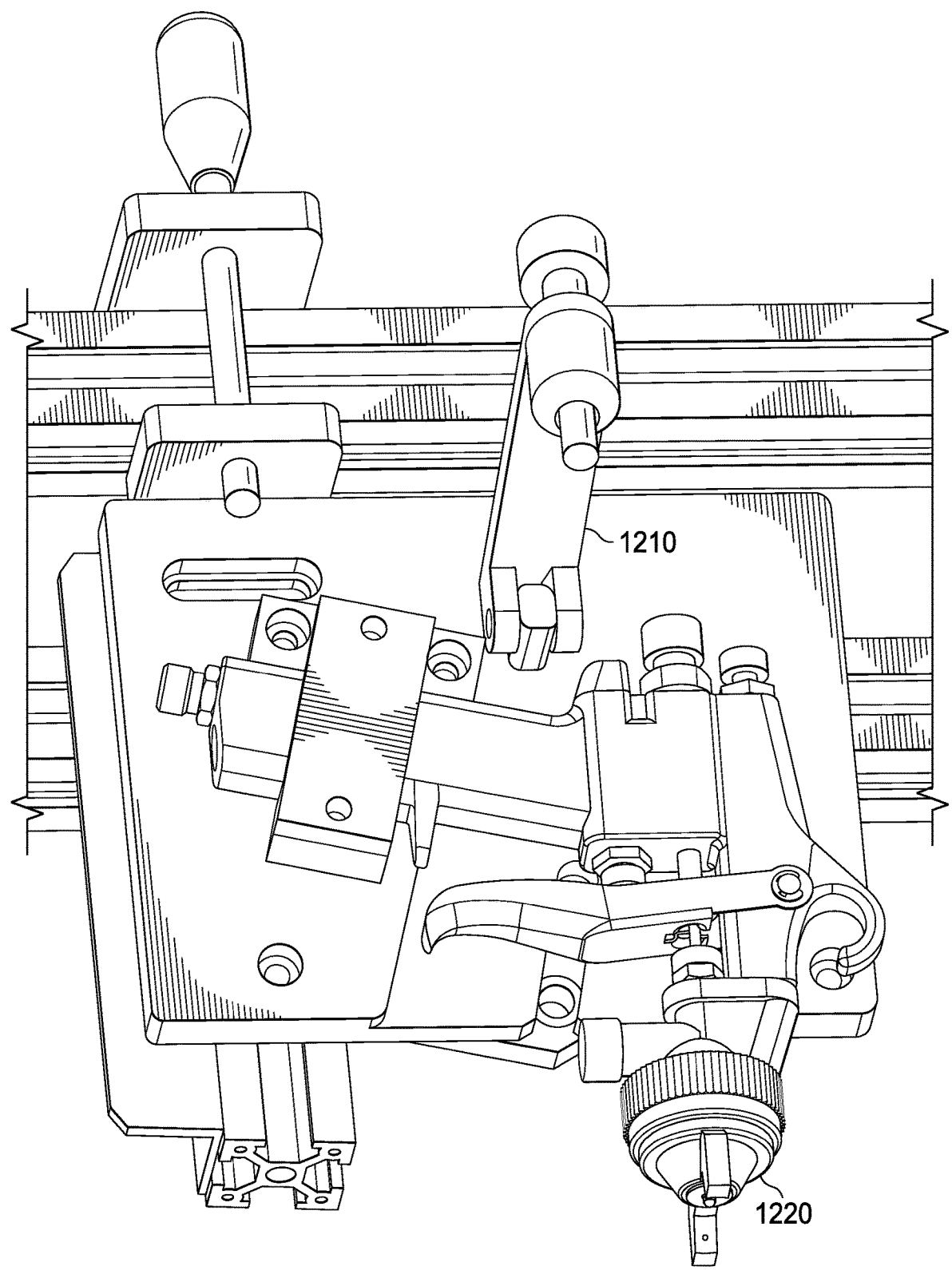
FIG. 12 illustrates an isometric view of a spray gun of a spray system according to a specific example embodiment of the disclosure.
Figure 13:
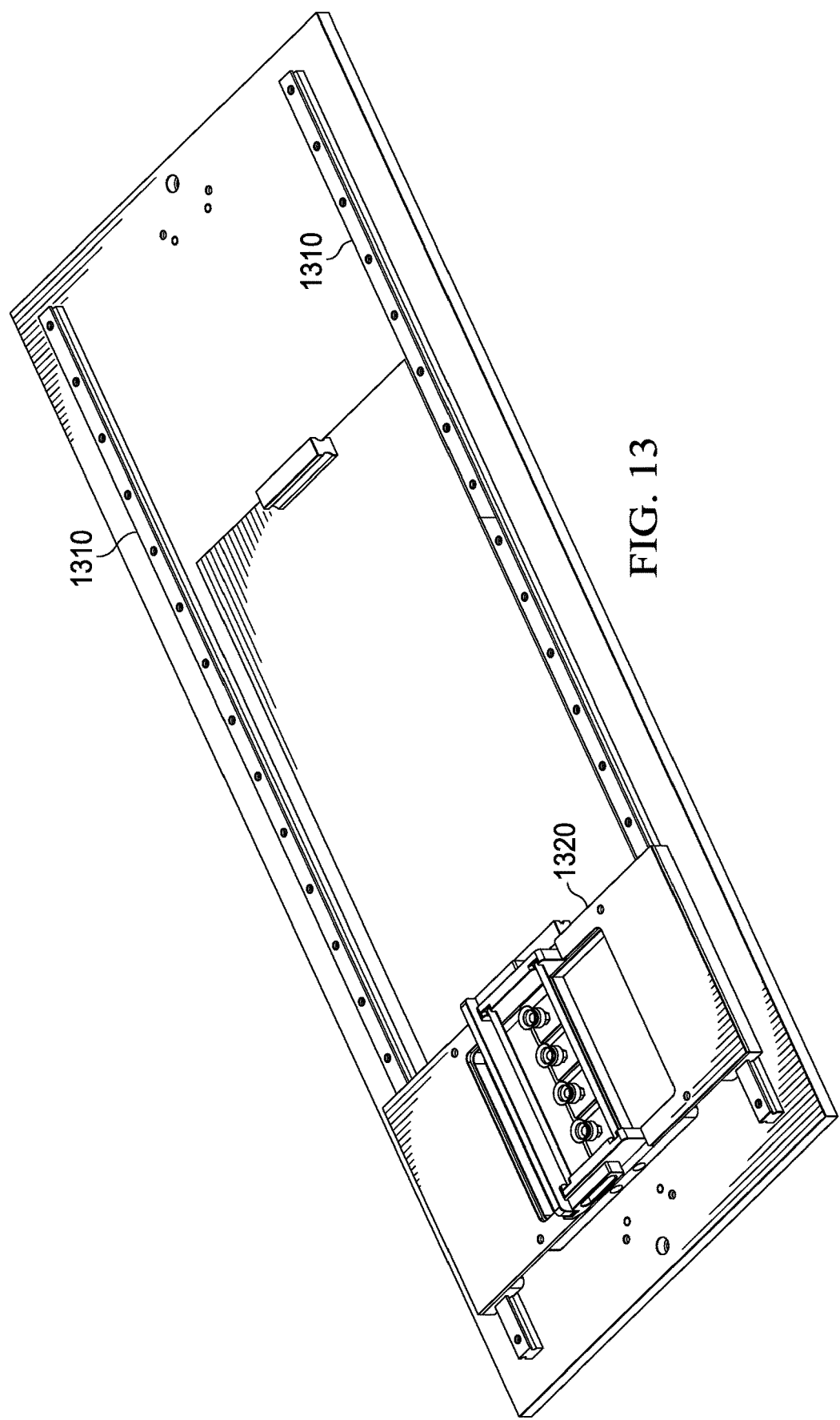
FIG. 13 illustrates an isometric view of a platform of a spray system according to a specific example embodiment of the disclosure.
Figure 14:
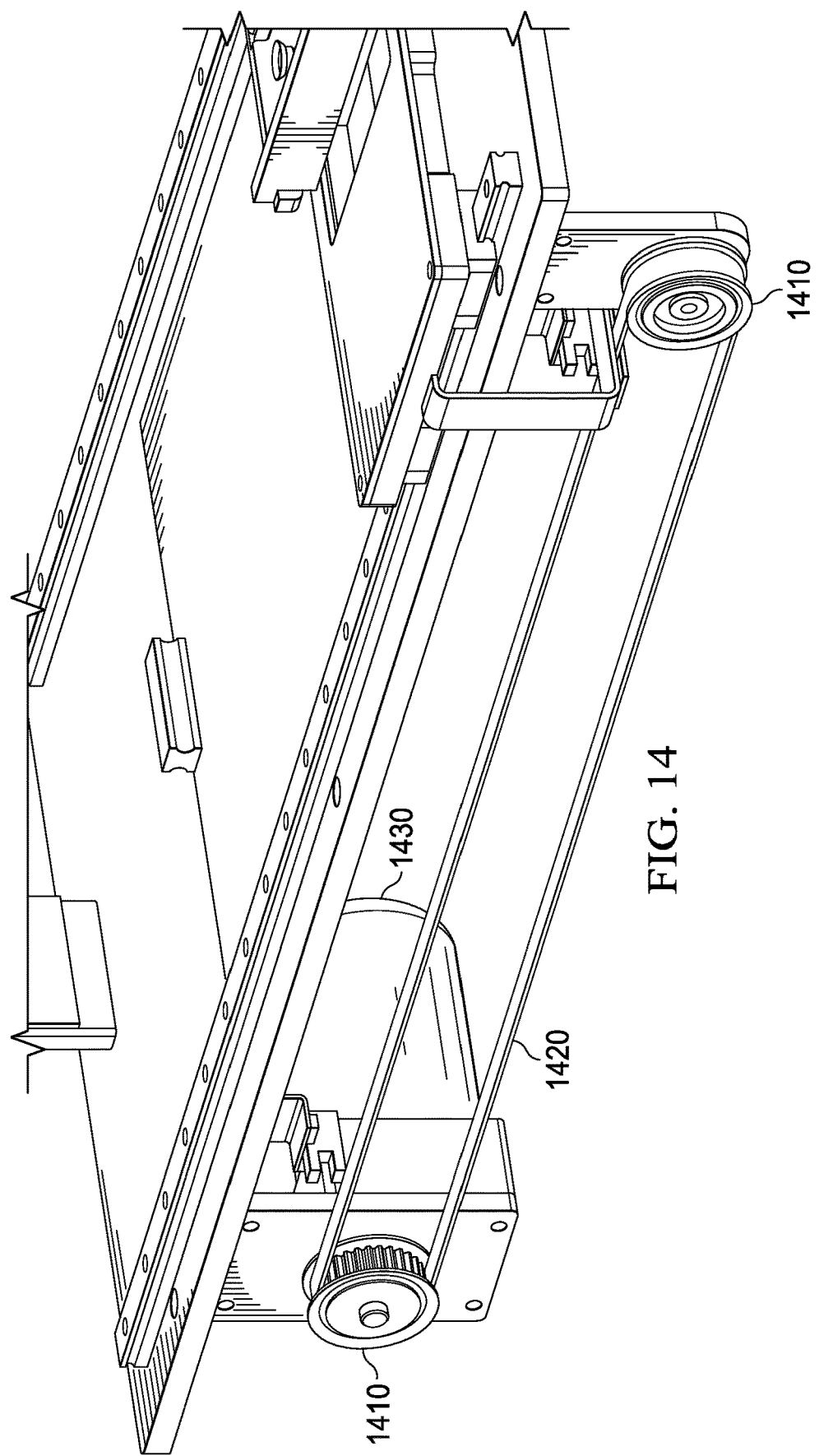
FIG. 14 illustrates an isometric view of a slide way of a spray system according to a specific example embodiment of the disclosure.

According to some embodiments, FIG. 10 illustrates an isometric view of a platform of a spray system comprising a table 1002, a platform 1004, a guard 1006, a chuck platform 1008, a chuck inlet 1010, a vacuum chuck 1012, and a substrate 1014. FIG. 11 illustrates an isometric view of a vacuum chuck of a spray system comprising at least one holder 1110, at least one spray system position guide 1130, and at least one vacuum chucks 1120. FIG. 12 illustrates an isometric view of a spray gun of a spray system comprising a switch 1210, wherein the switch may desirably control a position a trigger of a spray gun; and a spray gun 1220. FIG. 13 illustrates an isometric view of a platform of a spray system comprising at least one slide way 1310 and a platform 1320, wherein the platform may be substantially perpendicular to at least one spray gun, wherein the at least one slide way and platform are configured to support and adjust the position of at least one substrate. FIG. 14 illustrates an isometric view of a slide way of a spray system comprising at least one synchronous wheel 1410, at least one synchronous belt 1420, and at least one servo motor 1430. FIGS. 15A-15E illustrate spectra that may be used to determine various SPF values.

Figure 16A:
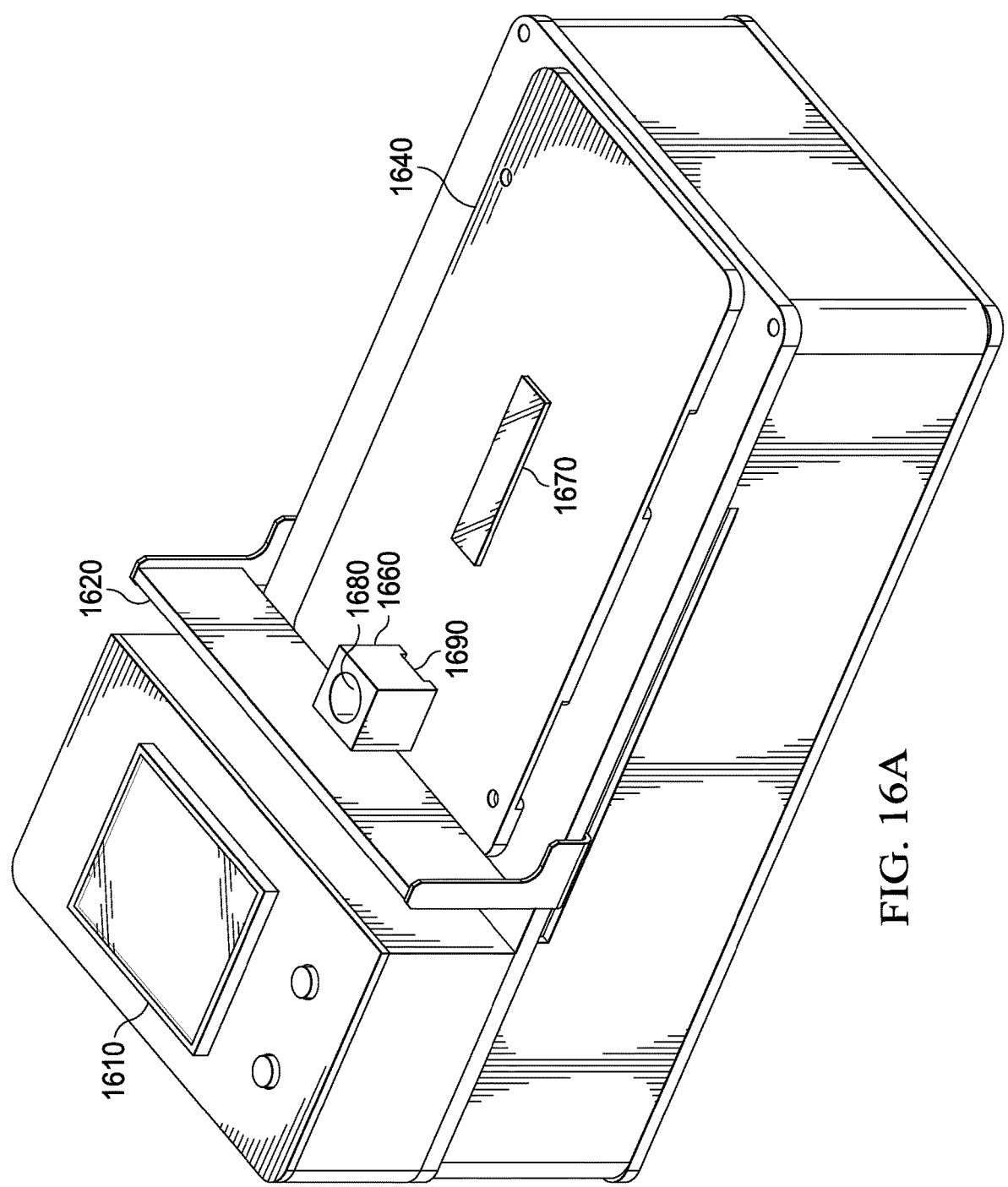
FIG. 16A illustrates an isometric view of a drawdown system comprising a sample receptacle at a starting position according to a specific example embodiment of the disclosure.
Figure 16B:
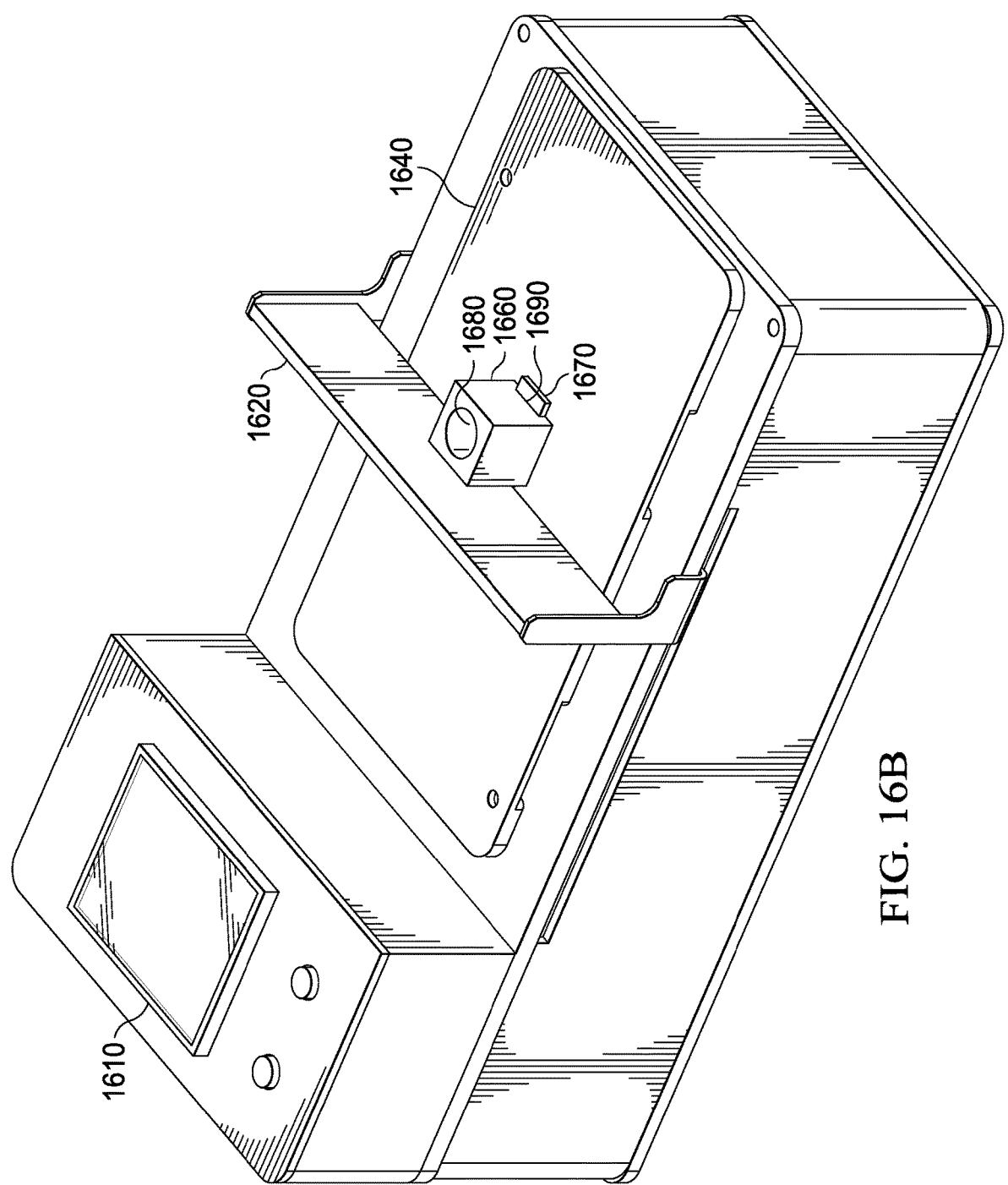
FIG. 16B illustrates an isometric view of a drawdown system comprising a sample receptacle at an advanced position according to a specific example embodiment of the disclosure.

FIGS. 16A and 16B illustrate an isometric view of a drawdown system comprising a sample receptacle 1660, a backboard 1620, a processor 1610, a platform 1640, and a substrate 1670. In some embodiments, a backboard 1620 may move from a starting position as shown in FIG. 16A to an advanced position FIG. 16B across a platform 1640, thereby adjusting the position of a sample receptacle 1660. A sample receptacle 1660 may be configured to release a photoprotective composition sample on a surface of a substrate 1670, wherein the photoprotective composition forms a film on the substrate 1670. FIGS. 16A and 16B illustrate a sample receptacle 1660 comprising a notch 1690 and a sample distribution compartment 1680. A photoprotective composition may be placed in a sample distribution compartment 1680 of a sample receptacle 1660, wherein the sample receptacle 1660 may be drawn down a system, thereby distributing a film of the photoprotective composition at a thickness substantially similar to the height of the notch 1690. For example, a notch 1690 may have a height of about 100 mm, wherein a sample receptacle 1660 may produce a sample film of about 100 mm on a surface of a substrate 1670. In some embodiments, a notch 1690 may have any desired shape, height, and/or dimensions to desirably produce a sample film of various thicknesses and shapes. A sample receptacle 1660 may be configured to hold different volumes of a photoprotective composition. For example, a sample receptacle 1660 may hold a volume from about 0.01 mL to about 100 mL. A sample receptacle 1660 may be configured to hold a volume of a photoprotective composition greater than about 100 mL or less than about 0.01 mL. A notch may have a height from about 0.1 mm to about 500 mm.

As will be understood by those skilled in the art who have the benefit of the instant disclosure, other equivalent or alternative compositions, devices, methods, and systems for quantitatively measuring photoprotection of a photoprotective composition can be envisioned without departing from the description contained herein. Accordingly, the manner of carrying out the disclosure as shown and described is to be construed as illustrative only.

Persons skilled in the art may make various changes in the shape, size, number, and/or arrangement of parts without departing from the scope of the instant disclosure. Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Where open terms such as "having" or "comprising" are used, one of ordinary skill in the art having the benefit of the instant disclosure will appreciate that the disclosed features or steps optionally may be combined with additional features or steps. Such option may not be exercised and, indeed, in some embodiments, disclosed systems, compositions, apparatuses, and/or methods may exclude any other features or steps beyond those disclosed herein. Elements, compositions, devices, systems, methods, and method steps not recited may be included or excluded as desired or required. Persons skilled in the art may make various changes in methods of preparing and using a composition, device, and/or system of the disclosure. For example, a composition, device, and/or system may be prepared and or used as appropriate for animal and/or human use (e.g., with regard to sanitary, infectivity, safety, toxicity, biometric, and other considerations).

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In addition, it may be desirable, in some embodiments, to mix and match range endpoints. Also, in some embodiments, each figure disclosed (e.g., in one or more of the examples, tables, and/or drawings) may form the basis of a range (e.g., depicted value +/− about 10%, depicted value +/− about 50%, depicted value +/− about 100%) and/or a range endpoint. With respect to the former, a value of 50 depicted in an example, table, and/or drawing may form the basis of a range of, for example, about 45 to about 55, about 25 to about 100, and/or about 0 to about 100. Disclosed percentages are weight percentages except where indicated otherwise.

All or a portion of a device and/or system for quantitatively measuring photoprotection of a photoprotective composition may be configured and arranged to be disposable, serviceable, interchangeable, and/or replaceable. These equivalents and alternatives along with obvious changes and modifications are intended to be included within the scope of the present disclosure. Accordingly, the foregoing disclosure is intended to be illustrative, but not limiting, of the scope of the disclosure as illustrated by the appended claims.

The title, abstract, background, and headings are provided in compliance with regulations and/or for the convenience of the reader. They include no admissions as to the scope and content of prior art and no limitations applicable to all disclosed embodiments.

EXAMPLES

Some specific example embodiments of the disclosure may be illustrated by one or more of the examples provided herein.

Example 1

Spectra obtained from measuring the UV absorption of samples produced by a drawdown method may be used to determine an SPF value. As shown in Table 1 spectra from FIGS. 7A-7E may be integrated to determine an area under a curve, which may be used to calculate an SPF value.

TABLE 1

SPF Values of Formulations.

| Formulation | Corresponding FIG. No. | Area Under the Curve | SPF Value |
|---|---|---|---|
| Standard Sample | 7C | 262.61 | 60 (in vivo) |
| Unknown Sample 1 | 7D | 278.69 | 64 (Calculated) |
| Unknown Sample 2 | 7E | 266.54 | 61 (Calculated) |
| 160722A | 7A | 197.5 | — |
| 160318E | 7B | 219.3 | — |

As shown in Table 2, SPF and a protection grade of UVA (PA) values may be calculated form integrated absorbance spectrum.

TABLE 2

Calculated SPF, critical wavelength, and PA Values of Various Samples.

| Sample # | SPF Raw data | PA Raw data | Critical Wavelength (CW) | SPF Label | PA Label | Calculated SPF | Calculated APA | Calculated SPF | Calculated PA |
|---|---|---|---|---|---|---|---|---|---|
| L1 | 34.6 | 146.6 | 378 | 50 | — | 1.84 | 1.77 | 68.5 | 59.5 |
| Ol1 | 26.7 | 79.9 | 377 | 30 | +++ | 1.42 | 0.97 | 26.3 | 9.3 |
| Ho1 | 32.4 | 110.1 | 373 | 50 | +++ | 1.72 | 1.33 | 52.7 | 21.5 |
| La1 | 34.0 | 119.8 | 373.5 | 50 | +++ | 1.81 | 1.45 | 63.9 | 28.2 |
| SZ17007 | 37.2 | 136.2 | 373.5 | | – | 1.98 | 1.65 | 95.0 | 44.4 |
| SZ17006 | 31.7 | 103.5 | 371 | | – | 1.68 | 1.25 | 48.3 | 17.9 |
| SZ17011 | 35.9 | 118.3 | 372 | | – | 1.91 | 1.43 | 81.0 | 27.0 |
| SZ17021 | 45.1 | 148.6 | 371.5 | | – | 2.40 | 1.80 | 250.2 | 62.9 |
| SZ17022 | 43.4 | 144.0 | 373.5 | | – | 2.31 | 1.74 | 202.8 | 55.2 |
| SZ17023 | 36.4 | 162.1 | 378.5 | | – | 1.94 | 1.96 | 86.2 | 91.5 |
| SZ17024 | 36.5 | 111.4 | 371.5 | | – | 1.94 | 1.35 | 87.0 | 22.3 |
| SZ17025 | 37.9 | 123.8 | 371.5 | | – | 2.02 | 1.50 | 103.6 | 31.5 |
| SZ17026 | 40.6 | 125.4 | 372.5 | | – | 2.16 | 1.52 | 144.0 | 32.9 |
| SZ17027 | 41.2 | 122.2 | 373.5 | | – | 2.19 | 1.48 | 154.0 | 3.1 |
| SZ17028 | 36.9 | 120.7 | 373.5 | | – | 1.96 | 1.46 | 91.3 | 28.9 |
| SZ17030 | 23.0 | 82.5 | 372 | | – | 1.22 | 1.00 | 16.6 | 10.0 |
| AN1 | 36.0 | 104.3 | 381.5 | 50+ | PA++++ | 1.91 | 1.26 | 82.2 | 18.3 |
| AQ1 | 21.0 | 83.0 | 381.5 | 50+ | PA++++ | 1.11 | 1.00 | 13.0 | 10.1 |
| Bi1 | 25.7 | 26.4 | 353.8 | 50+ | PA++++ | 1.37 | 0.32 | 23.3 | 2.1 |
| SU1 | 18.7 | 70.8 | 370.5 | 50+ | PA++++ | 0.99 | 0.86 | 9.8 | 7.2 |
| FR1 | 24.1 | 114.0 | 383.5 | 50+ | PA++++ | 1.28 | 1.38 | 19.1 | 23.9 |
| 160722A | 32.8 | 111.4 | 374 | 60 | PA++++ | 1.74 | 1.35 | 55.0 | 22.3 |
| 161113A | 29.4 | 96.5 | 373 | | | 1.56 | 1.17 | 36.4 | 14.7 |
| 150909 | 25.7 | 132.2 | 386 | | | 1.36 | 1.60 | 23.1 | 39.8 |
| 161114A | 16.8 | 77.8 | 387.5 | | | 0.89 | 0.94 | 7.8 | 8.7 |

Example 2

Sample preparation may involve diluting a testing specimen during a drawdown and/or spray methods. Diluting a sample may desirably promote workability. An oil-in-water sunscreen product solution may be diluted by adding a carbomer aqueous solution. To dilute an oil-in-water sunscreen product, begin by adding about 0.2% of a carbomer aqueous solution to deionized water while stirring. Then, add the oil-in-water sunscreen product into the mixture of carbomer aqueous solution in deionized water. Neutralize the mixture with a 10% NaOH aqueous solution, wherein the ratio of NaOH to Carbomer is about 3:10, by weight percentage. After neutralization, this diluted oil in water mixture may then be used in a draw down and/or spray method.

A water-in-oil and/or anhydrous sunscreen solution may be prepared by blending a mixture comprising cyclopentasiloxane, dimethiconol polymer (Wacker CM 1000), and cyclopentasiloxane, wherein the solution is mixed at about 1000 rpm for about 5 mins. Then, add a water-in-oil and/or anhydrous sunscreen sample into the mixture to product the diluted solution. This diluted water-in-oil and/or anhydrous sunscreen solution may then be used in a draw down and/or spray method.

Different ratios of sunscreen solution and diluting solution may be used. In some embodiments, an oil-in-water sunscreen product may be diluted with a 1:22 ratio of sunscreen product to diluting solution. A water-in-oil and/or anhydrous sunscreen product may be diluted with a 1:20 ratio of sunscreen product to diluting solution. A mixed diluted solution may be mixed at an angular velocity of 1500 rpm for about 5 minutes and then stored at room temperature for about 0.5 hours before using in a draw down and/or spray method.

A drawdown method may be performed by initially setting a zero point on the draw down bar with a glass slide. Adjust the spiral micrometers so that the drawdown bar is about 100 μM above the substrate. Apply a diluted sunscreen product before a substrate. Drawdown the diluted sunscreen product to form a film onto a surface of the substrate. Transport the substrate now coated with a sunscreen product film to an air oven to dry. Prepare at least four more coated slides and let the five slides dry in a convection air oven for about 60 minutes at a temperature of about 35° C. Using a HallStar UV-spectroscope sample holder, measure the UV-absorption spectrum of each sample. If a sample has an absorbance with a greater than 5% standard deviation from the average, discard the slide and prepare new samples accordingly.

Various light sources may be used. For example, a UVA sun tan lamp (HPA 400S), a Xenon long-arc lamp (300 W), and a Sunny day in Suzhou between noon-2 pm. A lamp may be suspended in a manner that provides radiation doses of about 9000 mJ/cm$^2$ per 5 minutes, wherein the irradiation time is about 10 minutes. This is similar to about 60 minutes of UVA irradiation from the sun at about noon. For a Xenon arc lamp, about 2 hours. A slide should be placed on a hollow surface to allow ample air movement around the sample to keep the sample temperature at about 35° C.±2° C. during the irradiation term. Around the sample, the irradiation environment should be dark in nature to prevent the reflected UV energy from hitting the sample. After irradiating the sample, each slide sample should be loaded back into a UV measurement holder so that the UV spectrum is measured on the same spot where the pre-irradiation measurement was taken. If a pre-irradiation spectrum measurement reaches a repeatability of less than about 5% of a standard deviation, the repeatability of the irradiation step is further qualified using the standard deviation of the post-irradiation spectrum.

To calculate an SPF/PA value, an average value of the measured spectra is determined from the 5 post-irradiation samples. As shown in FIGS. 15A-15E, a raw SPF number is determined by measuring an absorbance value of the specimen from a wavelength range from 290 nm to 400 nm, discounting each value per the Erythema Action Spectrum CIE-1987, then integrating the discounted absorption spectrum from 290 nm to 400 nm. This integrated value is the raw SPF number. To calculate a critical wavelength (CS) value, integrate the absorbance spectrum between 290 nm to 400 nm. This integration value is assigned "A." Determine the wavelength "X," wherein the integral absorbance from wavelength X to 400 nm is 0.1 (i.e., 10% of the integration value from 290-400 nm). Wavelength X is the critical wavelength of this sample.

To translate a raw SPF number and PA number into a standard SPF and/or PA value, begin by obtaining several standard samples with know/labelled SPF and/or PA values. Measure the raw SPF and raw PA values as described above. Plot the raw number against the labelled value to provide a working curve for translating raw performance data to labelled performance date. Then conduct a scientific in vivo study, a controlled spray of known thickness of a sample is made onto a human body next to a glass slide using a Hallstar spray setup. Carry out the in vivo measurement on human subjects and then measure the raw performance data as outlined above on the glass slides. This will allow a direct correlation of the glass slide raw data with the human subject in vivo data.

What is claimed is:

1. A method of determining a quantitatively measured photoprotection of a photoprotective composition, the method comprising:
   (a) distributing the photoprotective composition in a position in between a drawdown bar and at least one substrate positioned on a sample plate, to produce a distributed photoprotective composition;
   (b) adjusting, with at least two spiral micrometers, a height of the drawdown bar relative to a top surface of the sample plate, wherein the height is from about 25 µm to about 200 µm;
   (c) drawing down the drawdown bar across the sample plate to smear the distributed photoprotective composition, thereby forming a sample film having a thickness corresponding to the height of the drawdown bar relative to the top surface of the sample plate;
   (d) drying the sample film to produce a dried sample film;
   (e) measuring a UV absorption of the dried sample film to produce a UV absorption spectrum; and
   (f) determining the quantitatively measured photoprotection of the photoprotective composition from the UV absorption spectrum.

2. The method of quantitatively measuring photoprotection of claim 1, further comprising diluting the photoprotective composition with at least one solution to a viscosity from about 1000 cP to about 9000 cP before distributing the photoprotective composition in the position in between the drawdown bar and the at least one substrate.

3. The method of quantitatively measuring photoprotection of claim 2, wherein the at least one solution comprises water, dimethicone vinyl crosspolymer, an alkyl acrylate dimethicone crosspolymer, a cyclopentasiloxane, or combinations thereof.

4. The method of quantitatively measuring photoprotection of a photoprotective composition according to claim 1, wherein the thickness ranges from about 10 µm to about 100 µm.

5. The method of quantitatively measuring photoprotection of claim 1, wherein drying the drawdown sample film comprises heating the drawdown sample at a temperature from about 25° C. to about 60° C. for a time from about 10 minutes to about 120 minutes.

6. The method of quantitatively measuring photoprotection of claim 1, wherein the at least one substrate is selected from the group consisting of a glass, a polymer, a skin, a metal, and a textile.

7. The method of quantitatively measuring photoprotection of claim 6, wherein the glass comprises silica, quartz, fused silica, borosilicate glass, soda-lime silicate glass, phosphate glass, or combinations thereof.

8. The method of quantitatively measuring photoprotection of claim 6, wherein the skin comprises a porcine skin, a human skin, a cow skin, a mouse skin, a rat skin, a frog skin, a snake skin, or combinations thereof.

9. The method of quantitatively measuring photoprotection of claim 1, wherein the substrate has a length from about 50 mm to about 100 mm, a width from about 10 mm to about 40 mm, and a height from about 0.5 mm to about 5 mm.

10. The method of quantitatively measuring photoprotection of claim 1, wherein measuring the UV absorption of the dried sample film comprises measuring an absorbance at a range from about 200 nm to about 400 nm.

11. The method of quantitatively measuring photoprotection of claim 1, wherein determining the quantitatively measured photoprotection of the photoprotective composition comprises integrating the UV absorption spectrum.

12. The method of quantitatively measuring photoprotection of claim 1, wherein distributing the photoprotective composition in the position in between the drawdown bar and the at least one substrate comprises pumping, pipetting, syringing, pouring, positive displacing, scooping, smearing, spraying, squirting, transferring, displacing, or combinations thereof.

13. The method of quantitatively measuring photoprotection of claim 1, wherein the photoprotective composition comprises a sunscreen.

* * * * *